(12) United States Patent
Teller

(10) Patent No.: US 11,303,972 B2
(45) Date of Patent: Apr. 12, 2022

(54) RELATED CONTENT SUGGESTIONS FOR AUGMENTED REALITY

(71) Applicant: Google LLC, Mountain View, CA (US)

(72) Inventor: Eric Teller, San Francisco, CA (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 16/673,471

(22) Filed: Nov. 4, 2019

(65) Prior Publication Data

US 2020/0120398 A1    Apr. 16, 2020

Related U.S. Application Data

(63) Continuation of application No. 15/140,904, filed on Apr. 28, 2016, now Pat. No. 10,469,916, which is a (Continued)

(51) Int. Cl.
*H04N 21/81* (2011.01)
*H04N 21/45* (2011.01)
(Continued)

(52) U.S. Cl.
CPC ....... *H04N 21/812* (2013.01); *G02B 27/0172* (2013.01); *H04N 21/25883* (2013.01);
(Continued)

(58) Field of Classification Search
None
See application file for complete search history.

(56) References Cited

U.S. PATENT DOCUMENTS

| 5,138,555 A | 8/1992 | Albrecht |
| 5,231,379 A | 7/1993 | Wood et al. |

(Continued)

FOREIGN PATENT DOCUMENTS

| JP | 62157007 | 7/1987 |
| JP | 2005-70308 | 3/2005 |

(Continued)

OTHER PUBLICATIONS

Cakmakci et al., "Head-Worn Displays: A Review," Journal of Display Technology, 2006, pp. 199-216, vol. 2.
(Continued)

*Primary Examiner* — David J Stoltenberg
*Assistant Examiner* — Michael J Cross
(74) *Attorney, Agent, or Firm* — Lerner, David, Littenberg, Krumholz & Mentlik, LLP

(57) ABSTRACT

An example method involves a computing device: receiving point-of-view (POV) image data that is generated by an image capture device of a head-mountable device (HMD); using one or more real-world aspects detected in the POV image data as a basis for determining a context of the HMD; making a threshold determination as to whether or not the context of the HMD is appropriate for display of media content in the HMD; and when it is determined that the context is appropriate for display of media content in the HMD, then: (a) selecting first media content for display at the HMD, wherein the first media content is selected based at least in part on a combination of the determined context and a user-profile associated with the HMD; and (b) sending an indication to play out the first media content at the HMD.

20 Claims, 11 Drawing Sheets

Related U.S. Application Data continuation of application No. 13/428,964, filed on Mar. 23, 2012, now abandoned.

(51) Int. Cl.
  *H04N 21/258* (2011.01)
  *H04N 21/4223* (2011.01)
  *G02B 27/01* (2006.01)

(52) U.S. Cl.
  CPC ... *H04N 21/25891* (2013.01); *H04N 21/4223* (2013.01); *H04N 21/4532* (2013.01); *G02B 2027/0138* (2013.01); *G02B 2027/0141* (2013.01)

(56) References Cited

U.S. PATENT DOCUMENTS

| | | | |
|---|---|---|---|
| 5,506,730 A | 4/1996 | Morley et al. | |
| 5,519,410 A | 5/1996 | Smalanskas et al. | |
| 5,579,026 A | 11/1996 | Tabata | |
| 5,583,795 A | 12/1996 | Smyth | |
| 5,635,948 A | 6/1997 | Tonosaki | |
| 6,861,970 B1 | 3/2005 | Garland | |
| 6,919,866 B2 | 7/2005 | Kanevsky et al. | |
| 7,010,332 B1 | 3/2006 | Irvin et al. | |
| 7,038,699 B2 | 5/2006 | Sato et al. | |
| 7,073,129 B1 | 7/2006 | Robarts et al. | |
| 7,123,215 B2 | 10/2006 | Nakada | |
| 7,167,779 B2 | 1/2007 | Kashiwada et al. | |
| 7,180,476 B1 | 2/2007 | Guell et al. | |
| 7,255,437 B2 | 8/2007 | Howell et al. | |
| 7,315,254 B2 | 1/2008 | Smith et al. | |
| 7,327,239 B2 | 2/2008 | Gallant et al. | |
| 7,391,887 B2 | 6/2008 | Durnell | |
| 7,401,918 B2 | 7/2008 | Howell et al. | |
| 7,474,889 B2 | 1/2009 | Bhakta et al. | |
| 7,481,531 B2 | 1/2009 | Howell et al. | |
| 7,500,746 B1 | 3/2009 | Howell et al. | |
| 7,542,012 B2 | 6/2009 | Kato et al. | |
| 7,581,833 B2 | 9/2009 | Howell et al. | |
| 7,593,757 B2 | 9/2009 | Yamasaki | |
| 7,614,001 B2 | 11/2009 | Abbott et al. | |
| 7,677,723 B2 | 3/2010 | Howell et al. | |
| 7,771,046 B2 | 8/2010 | Howell et al. | |
| 7,783,391 B2 | 8/2010 | Jeong et al. | |
| 7,806,525 B2 | 10/2010 | Howell et al. | |
| 7,877,686 B2 | 1/2011 | Abbott et al. | |
| 7,922,321 B2 | 4/2011 | Howell et al. | |
| 7,945,297 B2 | 5/2011 | Philipp | |
| 7,987,070 B2 | 7/2011 | Kahn et al. | |
| 8,045,727 B2 | 10/2011 | Philipp | |
| 8,109,629 B2 | 2/2012 | Howell et al. | |
| 8,184,067 B1 | 5/2012 | Braun et al. | |
| 8,212,662 B2 | 7/2012 | Sasaki et al. | |
| 8,335,312 B2 | 12/2012 | Gerhardt et al. | |
| 8,384,617 B2 | 2/2013 | Braun et al. | |
| 8,432,614 B2 | 4/2013 | Amitai | |
| 8,510,166 B2 | 8/2013 | Neven | |
| 8,538,009 B2 | 9/2013 | Gerhardt et al. | |
| 8,559,621 B2 | 10/2013 | Gerhardt et al. | |
| 8,692,739 B2 | 4/2014 | Mathieu et al. | |
| 8,825,406 B2 | 9/2014 | Kumon | |
| 8,879,155 B1 | 11/2014 | Teller | |
| 8,893,164 B1 | 11/2014 | Teller | |
| 2002/0085843 A1 | 7/2002 | Mann | |
| 2003/0071766 A1 | 4/2003 | Hartwell et al. | |
| 2004/0104864 A1 | 6/2004 | Nakada | |
| 2005/0137755 A1 | 6/2005 | Chase et al. | |
| 2006/0028400 A1 | 2/2006 | Lapstun et al. | |
| 2006/0036490 A1 | 2/2006 | Sagalyn | |
| 2006/0103590 A1 | 5/2006 | Divon | |
| 2006/0105838 A1 | 5/2006 | Mullen | |
| 2006/0119539 A1 | 6/2006 | Kato et al. | |
| 2006/0256133 A1 | 11/2006 | Rosenberg | |
| 2006/0277474 A1 | 12/2006 | Robarts et al. | |
| 2007/0076897 A1 | 4/2007 | Philipp | |
| 2007/0098234 A1 | 5/2007 | Fiala | |
| 2007/0106172 A1 | 5/2007 | Abreu | |
| 2007/0121959 A1 | 5/2007 | Philipp | |
| 2007/0182812 A1 | 8/2007 | Ritchey | |
| 2007/0281762 A1 | 12/2007 | Barros et al. | |
| 2008/0068559 A1 | 3/2008 | Howell et al. | |
| 2008/0080705 A1 | 4/2008 | Gerhardt et al. | |
| 2008/0102947 A1 | 5/2008 | Hays et al. | |
| 2008/0140416 A1 | 6/2008 | Shostak | |
| 2008/0147488 A1 | 6/2008 | Tunick et al. | |
| 2008/0154438 A1 | 6/2008 | Kalik | |
| 2008/0180352 A1 | 7/2008 | Modir et al. | |
| 2008/0198230 A1 | 8/2008 | Huston | |
| 2008/0239080 A1 | 10/2008 | Moscato | |
| 2008/0262910 A1 | 10/2008 | Altberg et al. | |
| 2009/0019472 A1 | 1/2009 | Cleland et al. | |
| 2009/0055739 A1 | 2/2009 | Murillo et al. | |
| 2009/0062629 A1 | 3/2009 | Pradeep et al. | |
| 2009/0112694 A1 | 4/2009 | Jung et al. | |
| 2009/0177528 A1 | 7/2009 | Wu et al. | |
| 2009/0204484 A1 | 8/2009 | Johnson | |
| 2009/0234614 A1 | 9/2009 | Kahn et al. | |
| 2010/0001928 A1 | 1/2010 | Nutaro | |
| 2010/0066832 A1 | 3/2010 | Nagahara et al. | |
| 2010/0079356 A1 | 4/2010 | Hoellwarth | |
| 2010/0091139 A1 | 4/2010 | Sako et al. | |
| 2010/0149073 A1 | 6/2010 | Chaum et al. | |
| 2010/0157430 A1 | 6/2010 | Hotta et al. | |
| 2010/0164702 A1 | 7/2010 | Sasaki et al. | |
| 2010/0185529 A1* | 7/2010 | Chesnut | G06Q 30/00 705/26.1 |
| 2010/0191631 A1 | 7/2010 | Weidmann | |
| 2010/0245585 A1 | 9/2010 | Fisher et al. | |
| 2010/0249636 A1 | 9/2010 | Pradeep et al. | |
| 2010/0295769 A1 | 11/2010 | Lundstrom | |
| 2011/0018903 A1* | 1/2011 | Lapstun | G06F 3/011 345/633 |
| 2011/0060653 A1 | 3/2011 | King et al. | |
| 2011/0077056 A1 | 3/2011 | Park et al. | |
| 2011/0080289 A1 | 4/2011 | Minton | |
| 2011/0085700 A1 | 4/2011 | Lee | |
| 2011/0121976 A1 | 5/2011 | Johns et al. | |
| 2011/0125756 A1 | 5/2011 | Spence et al. | |
| 2011/0136480 A1 | 6/2011 | Osmann, Jr. | |
| 2011/0161160 A1 | 6/2011 | Carlson et al. | |
| 2011/0166942 A1 | 7/2011 | Vassilvitskii et al. | |
| 2011/0187547 A1 | 8/2011 | Kweon | |
| 2011/0187844 A1 | 8/2011 | Ogawa et al. | |
| 2011/0213664 A1 | 9/2011 | Osterhout et al. | |
| 2011/0231757 A1 | 9/2011 | Haddick et al. | |
| 2011/0234475 A1 | 9/2011 | Endo | |
| 2011/0241976 A1 | 10/2011 | Boger et al. | |
| 2011/0258049 A1* | 10/2011 | Ramer | G06Q 30/0273 705/14.66 |
| 2011/0267321 A1 | 11/2011 | Hayakawa | |
| 2012/0019641 A1 | 1/2012 | Reeder, III | |
| 2012/0050138 A1 | 3/2012 | Sato et al. | |
| 2012/0075168 A1 | 3/2012 | Osterhout et al. | |
| 2012/0075170 A1 | 3/2012 | Watson et al. | |
| 2012/0086625 A1 | 4/2012 | Takeda et al. | |
| 2012/0206322 A1* | 8/2012 | Osterhout | G02B 27/0093 345/8 |
| 2012/0229909 A1 | 9/2012 | Calvin et al. | |
| 2012/0235902 A1 | 9/2012 | Eisenhardt et al. | |
| 2012/0287040 A1 | 11/2012 | Moore et al. | |
| 2013/0021225 A1 | 1/2013 | Braun et al. | |
| 2013/0044129 A1 | 2/2013 | Latta et al. | |
| 2013/0063336 A1 | 3/2013 | Sugimoto et al. | |
| 2013/0093788 A1 | 4/2013 | Liu et al. | |
| 2013/0095894 A1 | 4/2013 | Gerhardt et al. | |
| 2013/0106674 A1 | 5/2013 | Wheeler et al. | |
| 2013/0120449 A1 | 5/2013 | Ihara et al. | |
| 2013/0154906 A1 | 6/2013 | Braun et al. | |
| 2013/0210497 A1 | 8/2013 | Gerhardt et al. | |
| 2013/0314303 A1 | 11/2013 | Osterhout et al. | |
| 2013/0335301 A1 | 12/2013 | Wong et al. | |

(56) References Cited

U.S. PATENT DOCUMENTS

2015/0121506 A1 4/2015 Cavanaugh
2016/0217623 A1 7/2016 Singh
2018/0224658 A1* 8/2018 Teller .................... H04H 60/46

FOREIGN PATENT DOCUMENTS

| JP | 2005-72867 | 3/2005 |
|---|---|---|
| WO | 2001/61672 | 8/2001 |
| WO | 2007/027456 | 3/2007 |
| WO | 2009/143564 | 12/2009 |
| WO | 2010/060146 | 6/2010 |

OTHER PUBLICATIONS

Calhoun et al., "Synthetic Vision System for Improving Unmanned Aerial Vehicle Operator Situation Awareness," Enhanced and Synthetic Vision 2005, May 2005, pp. 219-230, vol. 5802.
Hartberger, R., H&C Coffee History. Quality Coffee Company. 2006. Web. Mar. 4, 2010. <http://www.qualitycoffee.com/hchistory.htm>.
Loeffler, W., "100 years later, neon still glowing bright," McClatchy—Tribune Business News. Nov. 9, 2008. Web. Dec. 5, 2013 <http://search.proquest.com/docview/456859242?accountid=14753>.
Mackie, John, "Signs from Vancouver's Neon Age Stand the Test of Time," The Vancouver Sun: 0. Oct. 6, 2003. ProQuest. Web. Dec. 5, 2013 <http://search.proquest.com/docview/242386453?accountid=14753>.
Mullen, M., "Heinz To Light Up The Night With Refurbished Ketchup Sign," Heinz Online Newsroom. Nov. 5, 2007. Business Wire. Web. Dec. 5, 2013 <http://news.heinz.com/press-release/general/heinz-light-night-refurbishedketchup-sign>.
Pentland et al., "Modeling and Prediction of Human Behavior," Neural Computation, Massachusetts Institute of Technology, Nov. 1999, pp. 229-242, vol. 11.
Salvucci et al., "The time course of a lane change: Driver control and eye-movement behavior," Transportation Research, Part F 5, Mar. 2002, pp. 123-132.
Starner, Thad, "The Challenges of Wearable Computing: Part 1," Georgia Institute of Technology; IEEE; Jul.-Aug. 2001.
Starner, Thad, "The Challenges of Wearable Computing: Part 2," Georgia Institute of Technology; IEEE; Jul.-Aug. 2001.
Unpublished U.S. Appl. No. 13/472,902, filed May 16, 2012 entitled "Audio Advertisements Based on Gaze Information".
Unpublished U.S. Appl. No. 13/292,909, filed Nov. 9, 2011 entitled "Individualized Gaze Valuation Based on Gaze Data".
Unpublished U.S. Appl. No. 13/292,893, filed Nov. 9, 2011 entitled "Valuing Advertisement Space Based on Gaze Data".
Unpublished U.S. Appl. No. 13/292,898, filed Nov. 9, 2011 entitled "Marketplace for Advertising Space Using Gaze-Data Valuation".
Unpublished U.S. Appl. No. 13/292,904, filed Nov. 9, 2011 entitled "Real-Time Targeting of Advertisements Based on Gaze Direction".
Unpublished U.S. Appl. No. 13/428,964, filed Mar. 23, 2012 entitled "Gaze-Data Based Targeting of Advertising in Wearable Display".
Unpublished U.S. Appl. No. 13/474,970, filed May 18, 2012 entitled "Real-Time Trading of Gaze-Based Advertisement Opportunities".
Unpublished U.S. Appl. No. 13/428,979, filed Mar. 23, 2012 entitled "Feedback to Inform of Learnt Advertising Preferences".
Unpublished U.S. Appl. No. 13/478,218, filed May 23, 2012 entitled "Removal of Biometric Data from Gaze Data".
Unpublished U.S. Appl. No. 13/428,991, filed Mar. 23, 2012 entitled "Placement of Advertisements in See-Through Display of a Head-Mountable Device".
Unpublished U.S. Appl. No. 13/419,783, filed Mar. 14, 2012 entitled "Distributing Advertisements in a Wearable Display".

* cited by examiner

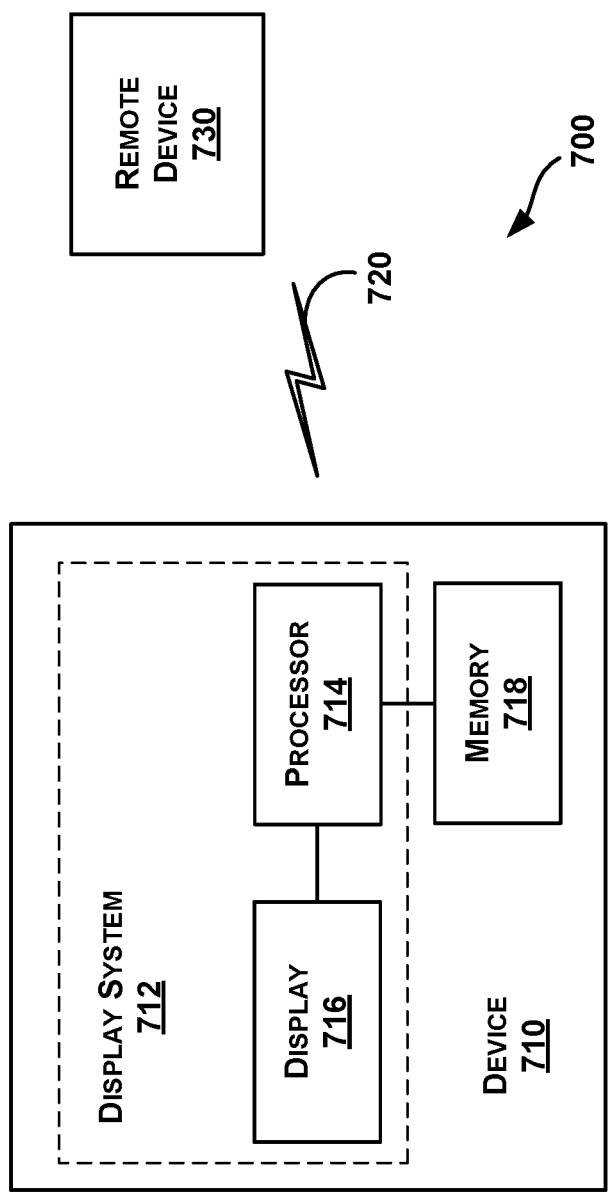

RELATED CONTENT SUGGESTIONS FOR AUGMENTED REALITY

CROSS-REFERENCE TO RELATED APPLICATIONS

The present application is a continuation of U.S. patent application Ser. No. 15/140,904, filed on Apr. 28, 2016, now U.S. Pat. No. 10,469,916, which is a continuation of U.S. patent application Ser. No. 13/428,964, filed Mar. 23, 2012, the disclosures of which are incorporated herein by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, a computer-implemented method involves: (i) receiving gaze data associated with a head-mountable display (HMD), wherein the gaze data is indicative of a wearer-view associated with the HMD; (ii) selecting at least one advertisement for display at the HMD, wherein the at least one advertisement is selected based at least in part on (a) the wearer-view, (b) a user-profile that is associated with the HMD, and (c) an advertiser-value that is associated with display of the advertisement at the HMD; and (iii) sending a message to the HMD that indicates to display the at least one selected advertisement at the HMD.

In another aspect, a system includes a non-transitory computer-readable medium and program instructions stored on the non-transitory computer-readable medium. The program instructions are executable by at least one processor to: (i) receive gaze data associated with an HMD, wherein the gaze data is indicative of a wearer-view associated with the HMD; (ii) select at least one advertisement for display at the HMD, wherein the at least one advertisement is selected based at least in part on (a) the wearer-view, (b) a user-profile that is associated with the HMD, and (c) an advertiser-value that is associated with display of the advertisement at the HMD; and (iii) send a message to the HMD that indicates to display the at least one selected advertisement at the HMD.

In yet another aspect, a computer-implemented method involves: (i) receiving, at an HMD, gaze data that is indicative of a wearer-view associated with the HMD; (ii) selecting at least one advertisement for display on a display of the HMD, wherein the at least one advertisement is selected based at least in part on (a) the wearer-view, (b) a user-profile that is associated with the HMD, and (c) an advertiser-value that is associated with display of the advertisement at the HMD; and (iii) causing the display of the HMD to display the at least one selected advertisement.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 7 illustrates a schematic drawing of a computing device according to an exemplary embodiment.

DETAILED DESCRIPTION

Figure 1:
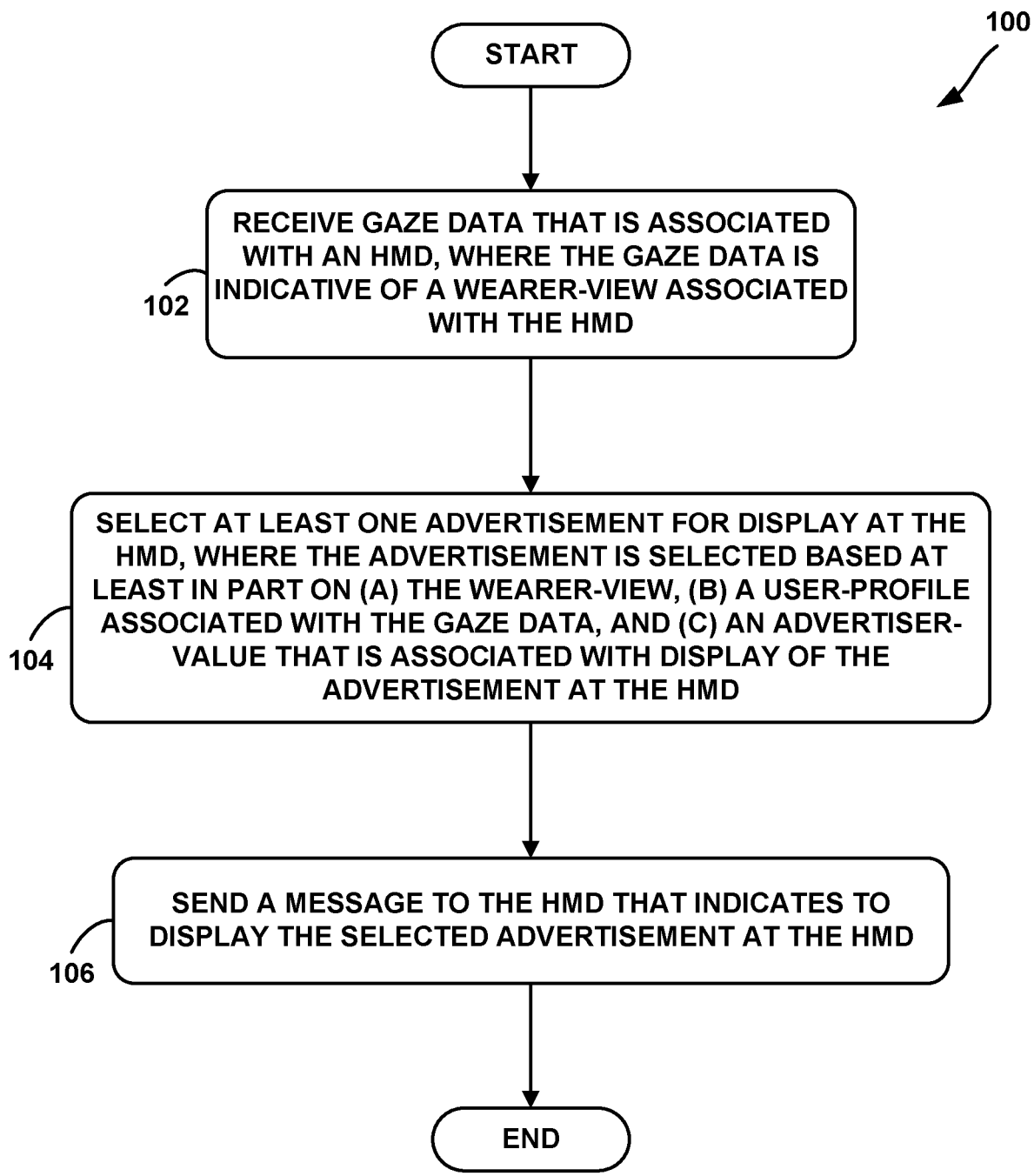
FIG. 1 is a flow chart illustrating a method, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. OVERVIEW

An exemplary embodiment may take advantage of gaze data acquired from a wearable computer in order to provide real-time targeting of advertisements that are displayed at a head-mountable display (HMD). Further, when selecting advertisements for display at an HMD, an exemplary system may consider the wearer's user-profile and the potential value to an advertiser of displaying an advertisement at the HMD, and attempt to select an advertisement that both interests the wearer and provides value to the advertiser.

For example, a server system may receive gaze data from a wearable computer with a head-mountable display (HMD), which is indicative of what a wearer of the HMD is looking at. The gaze data may take the form of or include point-of-view (POV) video from a camera mounted on an HMD. The server system may analyze the gaze data to determine what the wearer is looking at (or, if the HMD is not being worn at the time, what a wearer would see if the HMD were being worn). The server system may then evaluate candidate advertisements in an effort to select an advertisement that is appropriate given what the wearer is currently experiencing, and also balances the wearer's expected interest in the advertisement with the expected value to the advertiser of the wearer viewing the advertisement in their HMD. The selected advertisement may then be sent to the HMD for display at the HMD.

Further, the analysis of gaze data and the selection of an advertisement may be provided in substantially real-time. By doing so, a server system may help to provide real-time targeted advertising, which relates to what the wearer is currently looking at.

In some embodiments, the HMD may display augmented-reality advertisements, which graphically highlight aspects of the physical world that the wearer is viewing. For example, if an ad server detects a sign for a coffee shop in gaze data from an HMD, then the ad server may instruct the HMD to highlight the sign in the wearer's field of view by, for example, displaying a line surrounding the sign or an arrow directed at the sign, in the HMD. The line and/or arrow may then be located and/or moved within the HMD so as to keep the line and/or arrow substantially aligned with the sign in the wearer's field-of-view. Other examples are also possible.

Augmented-reality advertisements may also take other forms, which don't necessarily highlight an aspect of the physical world, but relate to the physical word in some other way. For example, when a product is detected in gaze data from an HMD, the HMD may display additional information about the product or a comparison to a competing product such that the additional information or comparison appears to be next to the product the wearer is looking at.

In other embodiments, the HMD may display advertisements to appear in a "picture-in-picture" style in the wearer's field of view (e.g., with the advertisement being a smaller picture within the larger picture of the wearer's real-world field-of-view). For instance, in the above scenario where an ad server detects a sign for a coffee shop in gaze data, the ad server may additionally or alternatively send the HMD an advertisement, such as a coupon for coffee, for display in the HMD. The advertisement may be displayed at a fixed location in the HMD, and further, may be located in the display such that the advertisement appears in the periphery of the wearer's field-of-view.

Note that an "advertisement" need not be a direct attempt to sell a good or service, and could generally be anything that someone pays to be displayed to someone. For example, a band could pay to have a music video for their song played back in an HMD, without directly offering to sell the song.

Also note that when gaze data is said to be associated with a given user-account, it should generally be understood that this gaze data was sent by a device that is associated with the given user-account (e.g., a device that is registered with the user-account). Further, gaze data and/or other information that is associated with a user-account may also be said to be associated with a user since, functionally, associating gaze data or any other data with a user will generally be accomplished by associating the data with the user's user account.

In a further aspect, when a user creates a user-account, a user-profile for the user-account may be created as well. The user-profile may include or provide access to various types of information, from various sources, which is related to the user. For simplicity, examples set forth herein may simply refer to a user-account as including the information included in the associated user-profile. However, this should not be read as requiring that a user-account include a user-profile. It is possible, in some embodiments, that a user-account may not have an associated user-profile. Furthermore, herein, the term user-profile may more generally be understood to refer to any information or collection of information related to a given user. As such, a user-profile may be specifically created for a user-account or may simply take the form of data that is associated with a given user.

II. EXEMPLARY METHODS

FIG. 1 is a flow chart illustrating a method 100, according to an exemplary embodiment. The method 100 shown in FIG. 1 is described by way of example as being carried out by a server system (e.g., an ad-selection system) in order to provide gaze-based customization of advertisements to HMDs. However, it should be understood that exemplary methods, such as method 100, may be carried out by other systems or combinations of systems, without departing from the scope of the invention.

As shown by block 102, method 100 involves the server system receiving gaze data that is associated with an HMD, where the gaze data is indicative of a wearer-view associated with the HMD. The server system then selects at least one advertisement for display at the HMD, where the advertisement is selected based at least in part on (a) the wearer-view, (b) a user-profile associated with the gaze data, and (c) an advertiser-value that is associated with display of the advertisement at the HMD, as shown by block 104. Once an advertisement is selected, the server system sends a message to the HMD that indicates to display the selected advertisement at the HMD, as shown by block 106.

A. Receiving Gaze Data

As noted, block 102 of method 100 involves the server system receiving gaze data that is associated with a certain HMD. Gaze data may be received at a server system using various forms of wired and/or wireless communication. However, it should be understood that the particular manner in which the gaze data is received should not be construed as limiting, unless explicitly stated otherwise.

Gaze data may be captured at the HMD, and may be indicative of the wearer-view associated with the HMD. In particular, the gaze data may take the form of or include point-of-view (POV) image data captured at the HMD. As such, the gaze data may be indicative of what the wearer of the HMD is seeing in and/or through the display of the HMD (e.g., what is in the field of view of the wearer).

In some embodiments, the gaze data from a wearable computing device may take the form of point-of-view video that is captured at the wearable computing device. As such, the POV video may be analyzed to detect aspects of the wearer view that provide information that can be used to select an advertisement for display to the wearer in the HMD. To do so, two or more frames from the POV video may be analyzed in order to select an ad that is related to or is otherwise appropriate to the wearer's situation or experience or aspects thereof.

Gaze data may take other forms in addition or in the alternative to POV video. For example, gaze data associated with a given wearable computing device may take the form of point-of-view images captured by a forward- or outward-facing camera on an HMD. As a specific example, an HMD may periodically take a picture, and then send the picture to an advertisement server system for use in generating wearer view data. Other examples are also possible.

Note also that when the wearer is wearing an HMD, the wearer-view may include both (i) real-world aspects (e.g., aspects of the wearer's real-world surroundings that the wearer sees through an optical see-through display, or as seen replicated on a video see-through display), and (ii) virtual aspects (e.g., graphics that are displayed in the HMD's see-through display). An exemplary method may take into account just the real-world aspects of the wearer-view, or both the real-world and virtual aspects, depending upon the implementation.

For example, a server system may analyze POV video captured at the HMD for real-world aspects captured in the POV video. By virtue of being captured in the POV video, the server system may determine that real-world aspects captured in the POV video are within the wearer's field of view. An ad-selection process may thus select an advertisement that relates to one or more real-world aspects of what the wearer is viewing. Other examples are also possible.

B. Selection of an Advertisement for Display at a Head-Mountable Display

As noted above, method 100 may be implemented to select an advertisement for display in an advertisement based on the: (a) the wearer-view associated with the HMD, which may be represented by the received gaze data, (b) the user-profile associated with the HMD (e.g., the user-profile of the HMD wearer), and (c) advertiser-value that is associated with display of the advertisement at the HMD (e.g., a value that is indicative of how much it is worth to the advertiser to display the advertisement at the HMD). This type of process, that involves the selection of an advertisement for display at an HMD, may be referred to herein as an "ad-selection process." Various ad-selection processes are possible, depending upon the particular implementation.

In an exemplary embodiment, the server system may take into account the current wearer-view, the user-profile associated with the HMD, and the value to the advertiser of displaying various advertisements, in an effort to select an advertisement that will both interest the wearer and provide value to the wearer.

For example, the ad-selection process may seek to balance the wearer's interest in the selected advertisement with the value to the advertiser of having the advertisement displayed to the wearer in their HMD. To do so, the server system may determine an interest value for a candidate advertisement. The interest value may be based at least in part on the user-profile associated with the HMD, and may thus be considered to be indicative of the wearer's interest level in the candidate advertisement. The server system may also determine the advertiser-value for the candidate advertisement. The server system can then use the interest value, the advertiser-value, and possibly other factors, to determine an overall display value that is associated with selecting the advertisement for display at the HMD. This process may be repeated for a number of candidate advertisements, and the advertisement having the highest overall display value may be selected.

Further, in some implementations, the ad-selection process may take other factors into account. For example, priority status and/or preferences for certain advertisements may also be taken into account when selecting an advertisement. As a specific example, in some embodiments, advertisers may be allowed to pay for priority placement of their advertisements, such that chances of their advertisement being displayed in some or all scenarios are increased. Other examples of priority and/or preference being given to certain advertisements are also possible.

i. Types of Advertisements

At block 104 of method 100, various types of advertisements may be selected for display by an HMD. For instance, in some implementations, an "augmented-reality" advertisement may be selected for display in an HMD. When displayed in the display of an HMD, an augmented-reality advertisement may be perceived by the wearer of the HMD as augmenting an aspect of their real-world field of view.

In some embodiments, an augmented-reality advertisement may take the form of a visual highlight, which visually augments at least one aspect of the wearer-view. Visual highlights may generally be any type of graphic that, when displayed on the HMD, may help to emphasize or draw attention to an aspect of the wearer-view. Examples of visual highlights include, but are not limited to: (a) one or more arrows that are directed that appear, in the wearer-view, to be directed at an aspect of the wearer-view, (b) an outline of an aspect in the wearer-view, and/or (c) a graphic overlay that is substantially aligned in the wearer-view with the detected aspect of the wearer view, among others.

Figure 2A:
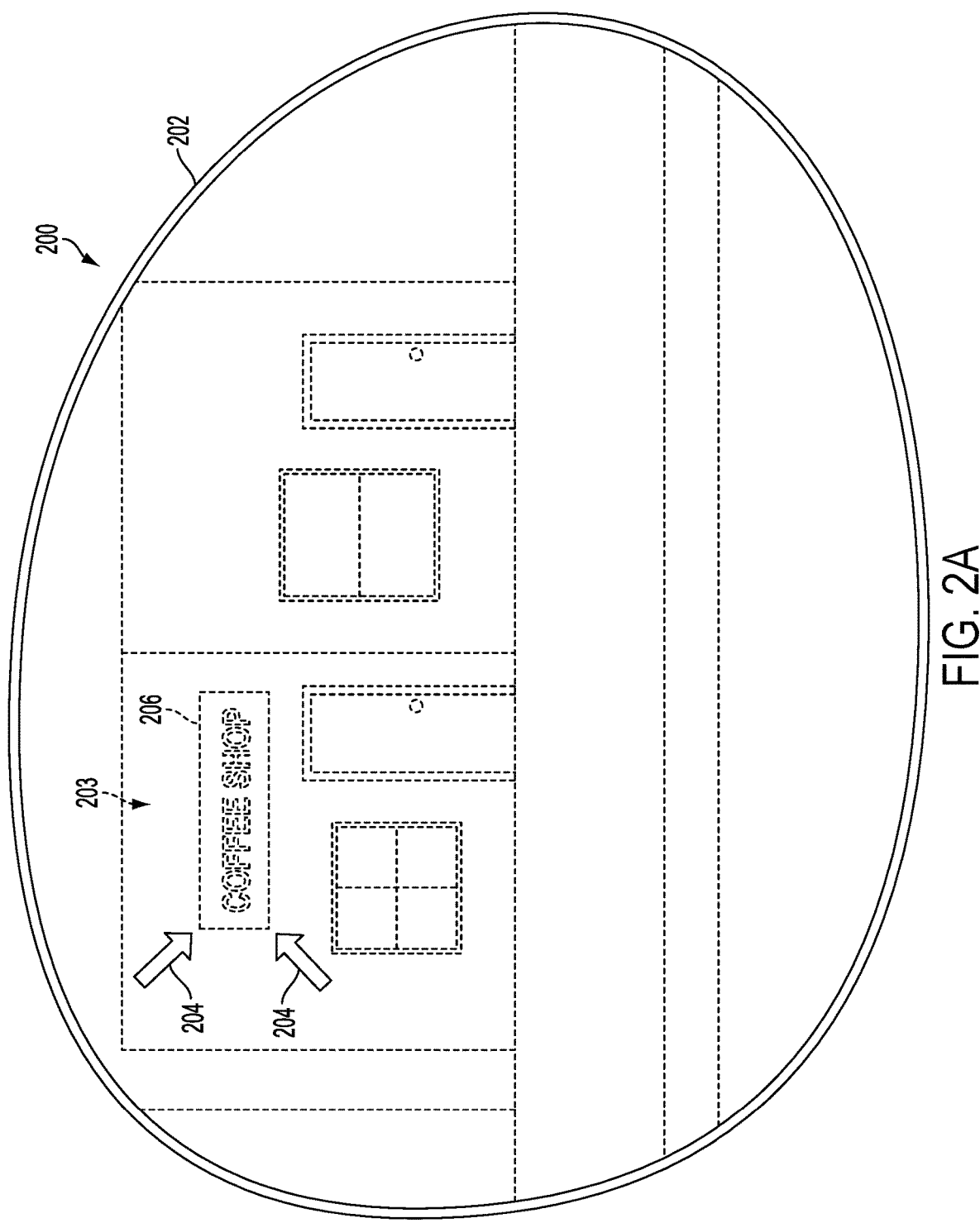
FIG. 2A is a simplified illustration of an advertisement that visually highlights an aspect of a wearer-view, according to an exemplary embodiment.

As an example, FIG. 2A is a simplified illustration of an advertisement that visually highlights an aspect of a wearer-view 200, according to an exemplary embodiment. More specifically, in FIG. 2A, HMD 202 is displaying arrows 204 in its display, such that the arrows 204 align with "Coffee Shop" sign 206 in the field of view of a person wearing the HMD 202. As such, arrows 204 are visual highlights that help to advertise coffee shop 208 by directing the wearer's attention to the "Coffee Shop" sign 206.

Figure 2B:
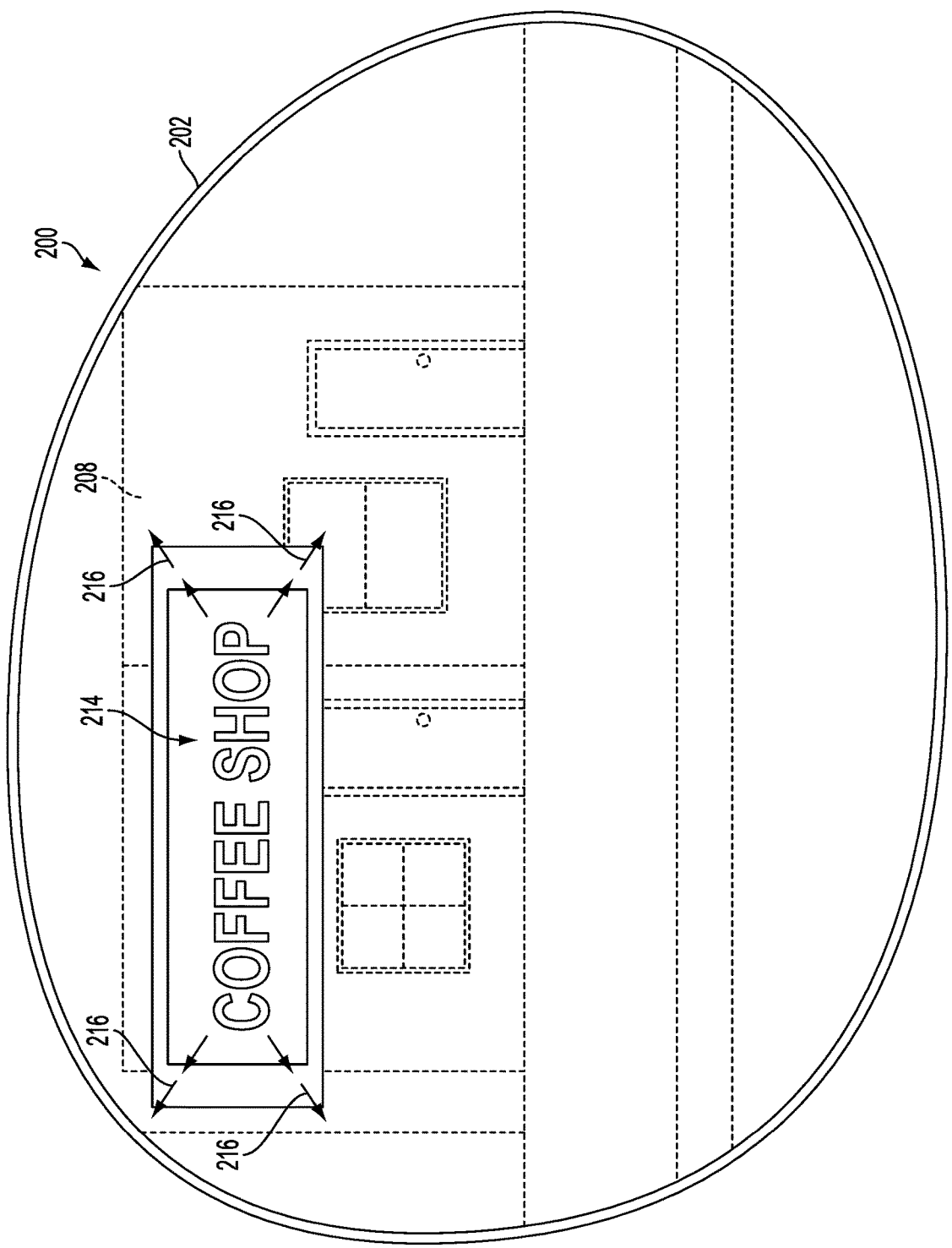
FIG. 2B is a simplified illustration of another advertisement that visually highlights an aspect of the same wearer-view shown in FIG. 2A.

Visual highlights that serve as advertisements may take various other forms. For example, FIG. 2B is a simplified illustration of another advertisement that visually highlights an aspect of wearer-view 200. More specifically, in FIG. 2B, HMD 202 is displaying a "Coffee Shop" graphic 214 such that the graphic substantially aligns with the coffee shop 208 in the field of view of the person wearing HMD 202. As such, "Coffee Shop" graphic 214 is a visual highlight, which may help to advertise for coffee shop 208 by directing the wearer's attention to the "Coffee Shop" graphic 214.

Figure 2C:
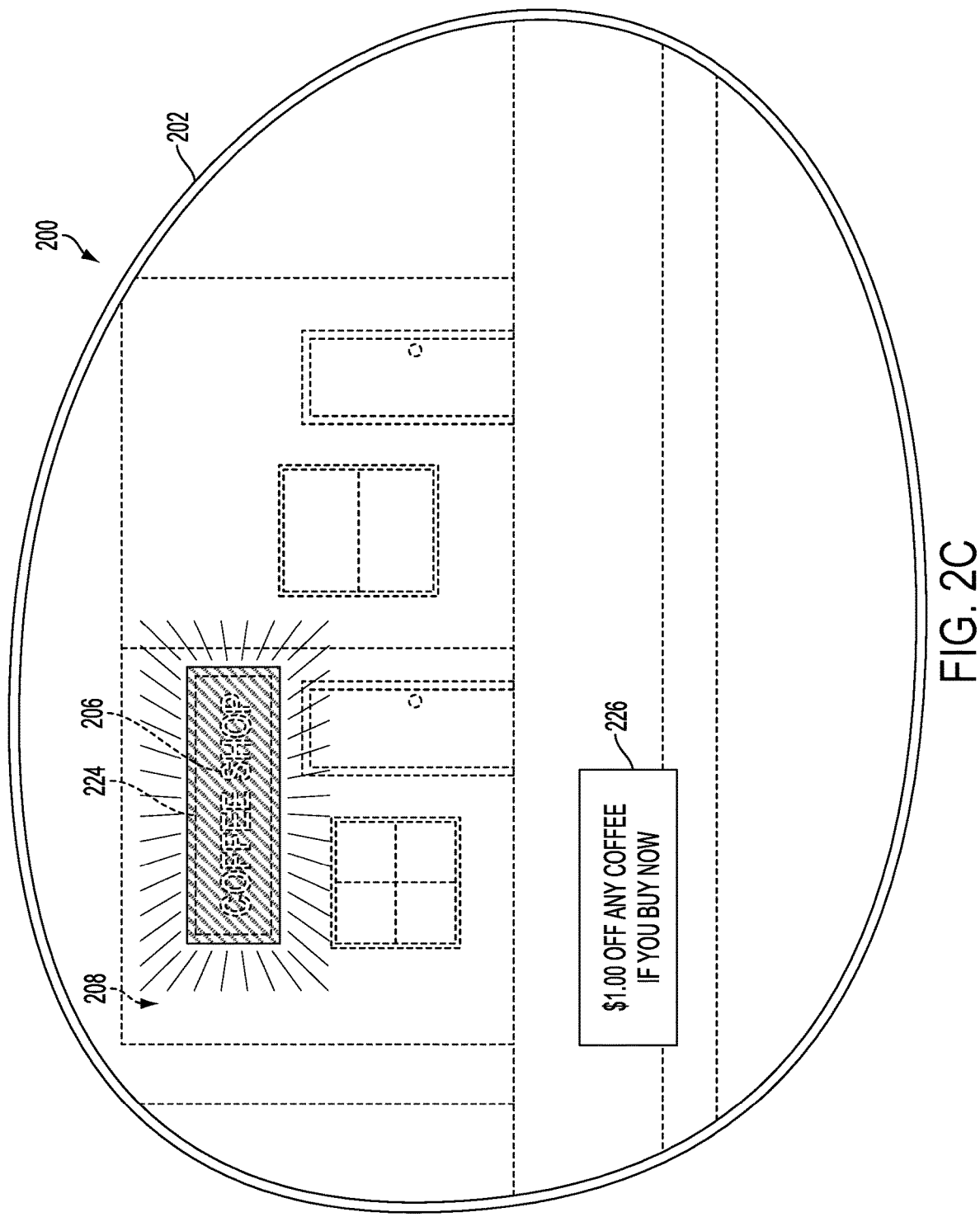
FIG. 2C is a simplified illustration of another advertisement that visually highlights an aspect of a wearer-view, according to an exemplary embodiment.

As an additional example, FIG. 2C is a simplified illustration of another advertisement that visually highlights an aspect of a wearer-view 200, according to an exemplary embodiment. More specifically, in FIG. 2C, HMD 202 is displaying a translucent graphic 224 such that the graphic is overlaid on "Coffee Shop" sign 206 in the field of view of the person wearing HMD 202. In an exemplary embodiment, the translucent graphic 224 may be colorful (e.g., a bright yellow or green) and/or patterned, so as to draw the wearer's attention, while at the same time allowing the wearer to see the real-world aspect of the wearer-view that is being advertised (e.g., "Coffee Shop" sign 206).

In a further aspect, visual highlights, such as arrows 204, "Coffee Shop" graphic 214, and/or translucent graphic 224, may be animated in order to help direct the wearer's attention to an aspect of the wearer view that is being advertised. As an example, referring to FIG. 2B, the "Coffee Shop" graphic 214 may be animated to help draw attention to coffee shop 208. For instance, "Coffee Shop" graphic 214 may be animated so that it appears to move towards the wearer from a surface of coffee shop 208; e.g., by expanding outward along dotted lines 216.

As another example, referring to FIG. 2C, the translucent graphic 224 could be animated to help draw attention to coffee shop 208. For instance, translucent graphic 224 could be flashed in the display of the HMD (e.g., by repeatedly displaying and then removing the graphic from the display). Other animations are possible as well.

Figure 3A:
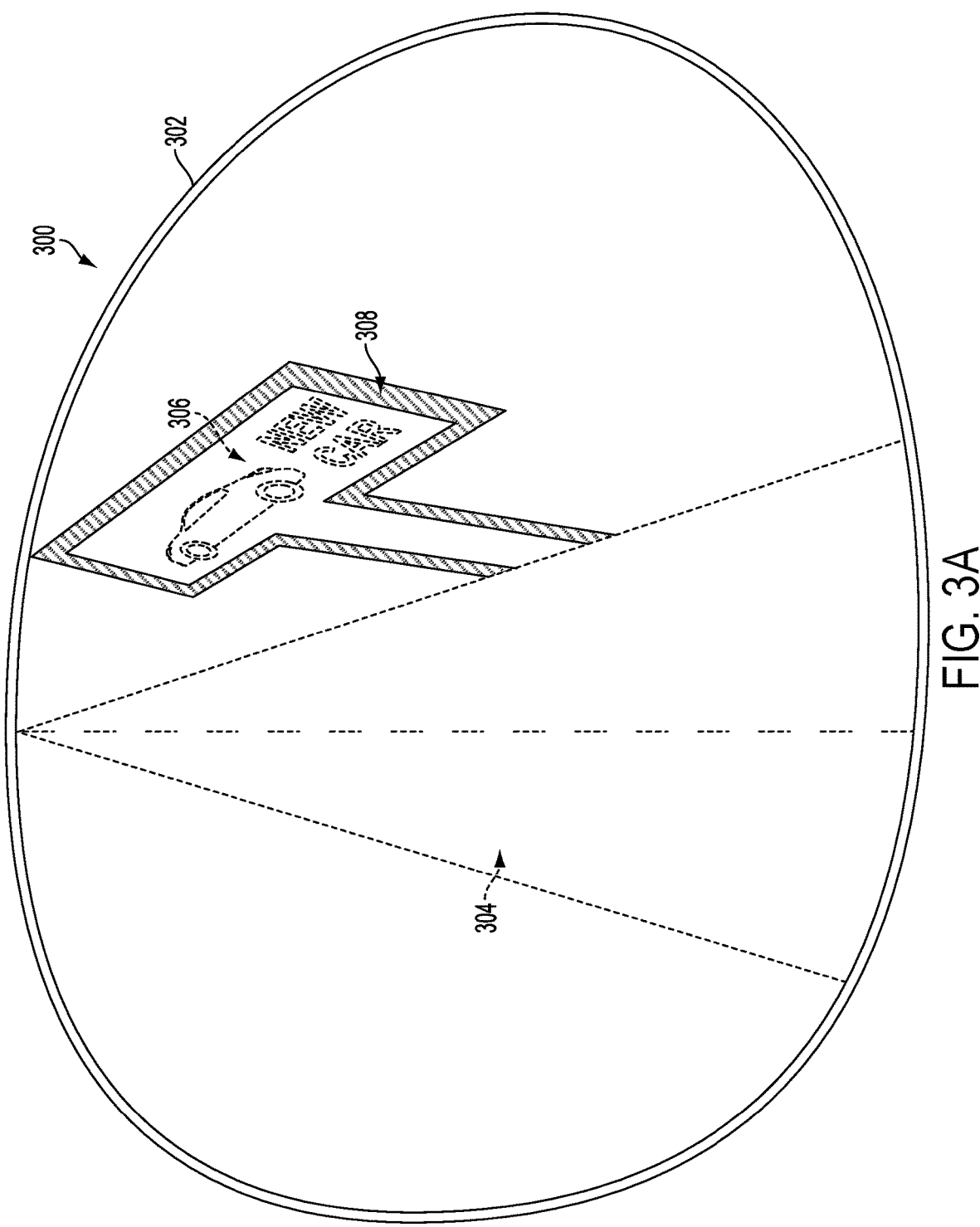
FIG. 3A is a simplified illustration of an advertisement that visually highlights an aspect of another wearer-view, according to an exemplary embodiment.

FIG. 3A is a simplified illustration of an advertisement that visually highlights an aspect of another wearer-view 300, according to an exemplary embodiment. More specifically, FIG. 3A illustrates a wearer-view 300 as it may be perceived by the wearer of an HMD 302. As shown, wearer-view 300 includes a road 304 and a billboard 306 with an advertisement for a new car. Further, HMD 302 is displaying an outline 308 such that in the wearer-view, the outline 308 appears to surround the billboard 306. As such, outline 308 is a visual highlight that may help to draw the wearer's attention to the billboard 306.

Figure 3B:
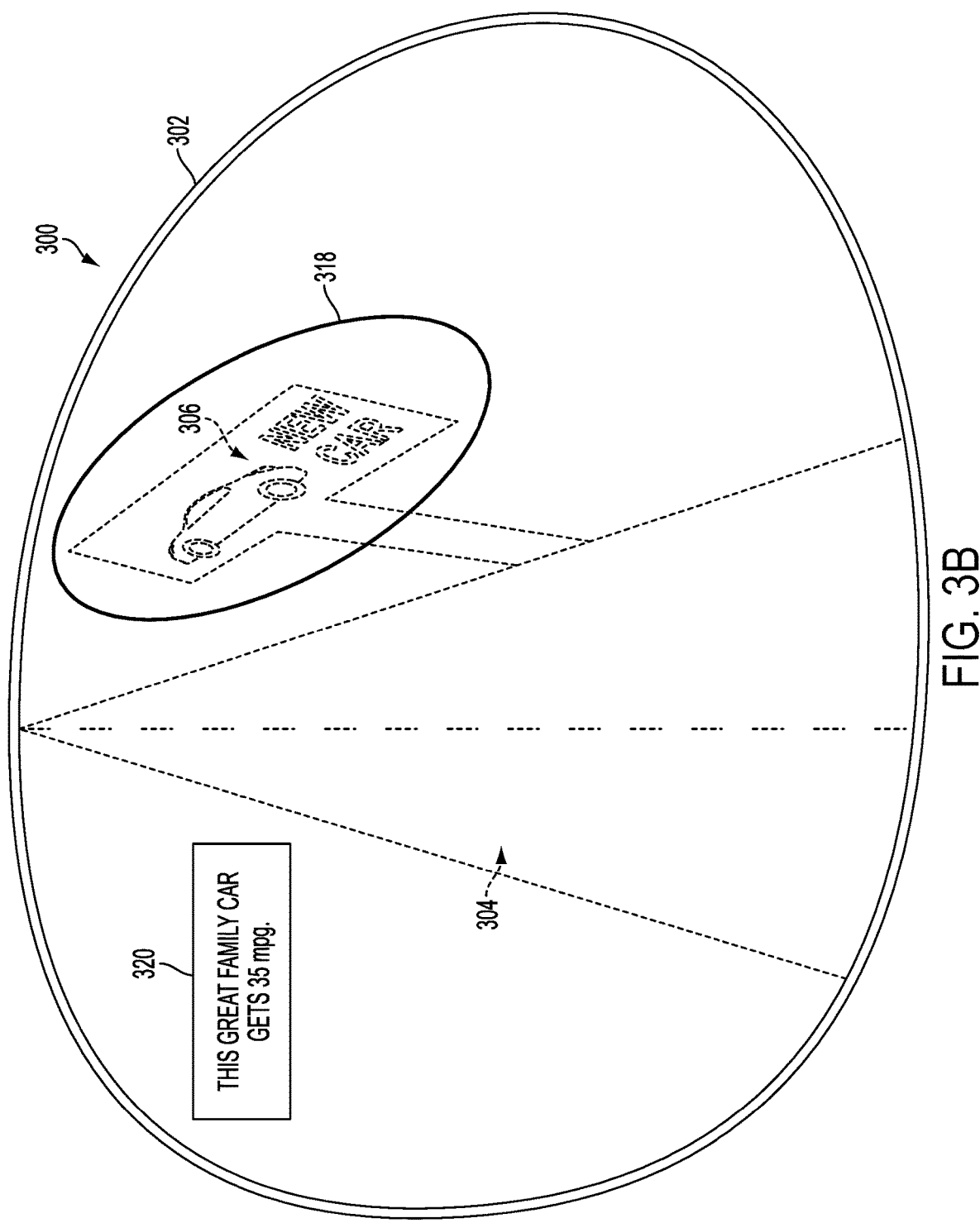
FIG. 3B is a simplified illustration of another advertisement that visually highlights an aspect of wearer-view, according to an exemplary embodiment.

Note that an outline, and other types of visual highlights that augment an aspect of the wearer-view, may vary in shape and/or size. For example, FIG. 3B is a simplified illustration of another advertisement that visually highlights an aspect of wearer-view 300, according to an exemplary embodiment. More specifically, FIG. 3B shows an outline 318, which is visually different from the outline 308 shown in FIG. 3A. In particular, outline 318 is simply a ring that appears, in the wearer-view, to surround billboard 306.

It should be understood that the examples of visual highlights discussed in relation to FIGS. 2A, 2B, 2C, 3A, and 3B are provided for illustrative purposes, and are not intended to be limiting. Variations on the above-described examples and other types of visual highlights are also possible.

In other implementations, the server system may select an advertisement that does not augment the wearer's view of the real-world. For example, the server may select a "picture-in-picture" style advertisement, which an HMD may display without consideration as to the positioning the ad in its display relative to the view of the real-world. In such an embodiment, there may be a predetermined location in the display that is designated for display of advertisements. As one example, the HMD may display such an advertisement in an application window. Alternatively, a location for display of the advertisement may be dynamically selected based on various criteria.

When a non-augmented-reality advertisement is selected, the advertisement selected at block 104 of method 100 might be displayed by an HMD, without visually augmenting a real-world aspect of the wearer-view 300. For example, referring again to FIG. 3B, an advertisement server may analyze gaze data from HMD 302 and detect that billboard 306 includes an advertisement for a new car. The advertisement server may then select an advertisement in view of the particular wearer's user-profile, which relates to the billboard 306. For instance, the server may take into consideration information from the user-profile that is associated with HMD 302, which indicates that the wearer has two young children and has historically purchased cars that have above-average gas mileage. In light of this information, the advertisement server may create a custom advertisement message that indicates that the new car makes a great family car and gets good gas mileage (e.g., 35 miles per gallon (mpg)). The advertisement server may then send this advertisement message to the HMD 302. The HMD 302 may then display the advertisement message in an advertisement window 320.

Referring back to FIG. 2C, advertisement window 226 provides another example of an advertisement that does not visually augment a particular real-world aspect of the wearer-view 200. In particular, when the coffee shop 208 is detected in gaze data associated with HMD 202, an ad server may responsively select an advertisement that provides a coupon to the coffee shop. The ad server may then indicate to HMD 202 to display an advertisement message that states: "$1.00 off any coffee if you buy now." When HMD 202 receives this message, it may responsively display the message in advertising window 226 (possibly with a link or another interactive element that allows the wearer to retrieve and/or store the coupon associated with the advertisement message).

ii. Incorporating the Wearer-View in the Ad-Selection Process

At block 104 of method 100, the ad-selection process may take the wearer-view into account in various ways. In particular, the ad-selection process may use the wearer-view to help select an advertisement that relates to what the wearer is currently viewing. In some embodiments, the server system may identify a set of advertisements that relate in some manner to what the wearer is currently viewing, determine interest values and advertiser-values for the set of advertisements, and select an advertisement (or possibly multiple advertisements) from the set based on the interest values and the advertiser-values for the respective advertisements.

An advertisement may relate to the wearer-view, or aspect(s) thereof, in various ways, depending upon the implementation. For example, wearer-view may be considered during the ad selection process in order to determine a context associated with the HMD from which the corresponding gaze data was received. The ad-selection process may then use the context to help select an advertisement that is more likely to be of interest to the wearer in light of the real-world aspects that are currently being viewed by the wearer. As a specific example, referring back to FIG. 2C, the advertisement message of "$1.00 off any coffee if you buy now" may be selected, at least in part, because it is believed that a wearer who is looking at coffee shop 208 might be interested in a coupon providing a discount at the coffee shop. Other examples are possible as well.

In some cases, the server system may use the wearer-view in combination with other context signals to determine the context upon which ad selection is based. For example, consider again the scenario where coffee shop 208 is detected in the gaze data. However, in this example, it may have been determined that that the wearer was just located inside the coffee shop, and that the wearer purchased coffee while inside the shop. This context may be derived by analyzing the gaze data and determining that the wearer is holding a cup of coffee, handed money to an employee of the coffee shop, and so on, as well as by evaluating other sources of context information, such as location (e.g., inside the coffee shop) and/or information from the a credit-card account that the wearer associated with their user-profile, which indicates the wearer just purchased coffee. When such context is detected, the server system may accordingly determine that it is not a desirable to offer the wearer a coupon for "$1.00 off any coffee if you buy now." Accordingly, the server may refrain from sending the coupon to the HMD in this context. Note that this example also illustrates how historical context information may be used to determine a current context.

As another example, consider a scenario where gaze data from an HMD indicates a television in an electronics store is within the wearer's field of view. Further, the HMD may send eye-tracking data to the server system. If it is detected that a user is staring at the television for a certain period of time (e.g., based on the eye-tracking data), it may be inferred that the wearer is interested in the television, as compared to other aspects of the wearer-view. Therefore, an advertisement for the television (and possibly advertisements for other comparable televisions sold by the store) may be selected for display by the HMD. For instance, the advertisement might indicate promotions or sales related to the television and/or might provide technical specifications of the television. Many other specific examples are also possible.

In a further aspect, the ad-selection process may additionally or alternatively take the wearer-view into account when determining the interest value and/or when determining the advertiser-value for a given advertisement. In particular, since the wearer-view may be indicative of the wearer's current environment and/or situation, the wearer-view may provide context that affects the interest value and/or the advertiser-value. As such, the interest value and/or the advertiser-value may be adjusted according to the context provided by the wearer-view.

In some embodiments, the wearer-view may be analyzed not only to determine which advertisement should be displayed by the HMD, but also which version or format of an advertisement should be displayed. For instance, a set of advertisement variations may be provided for a given product, with each variation in the set including different characteristics and/or features. As a specific example, consider a set of advertisements for a car in which the car is shown in blue or yellow, and in which either a man or woman is shown in the car, thus providing four possible variations. Over time, the server system may analyze gaze data associated with a given user-profile, and observe that the associated wearer spends more time looking at women than at men, and more time looking at blue cars than at yellow cars. As such, the historical wearer-view may provide context for determining which advertisement from the set should be selected for the wearer. In particular, the server system may select the variation of the car advertisement showing a woman driving a blue car. Many other examples are possible as well.

In some embodiments, the wearer-view may additionally or alternatively be considered during the ad selection process to determine whether or not it is an appropriate context to display an advertisement in the HMD's display. For instance, a server system may analyze POV video from the HMD (and possibly other context signals associated with the HMD), and detect that the wearer seems to be riding a bus. The server system may determine that it is appropriate for the HMD to display an ad while the wearer is riding the bus, and thus may select an ad based on, e.g., information provided by the user-profile that is currently associated with the HMD. However, if the HMD concludes that the wearer is currently driving, it may conclude that selection of an ad for display by the HMD is not appropriate, and refrain from doing so.

In another aspect, the server system may analyze the wearer-view to identify one or more aspects of the wearer-view that are appropriate for visual advertisement augmentation, and then attempt select an advertisement that will augment the identified aspect or aspects. For instance, referring back to FIGS. 2A to 2C, the selection of visual highlights 204, 214, and 224, may be based upon detecting the coffee shop 208 and/or the "Coffee Shop" sign 206 in the wearer-view. Other examples are also possible.

Figure 4:
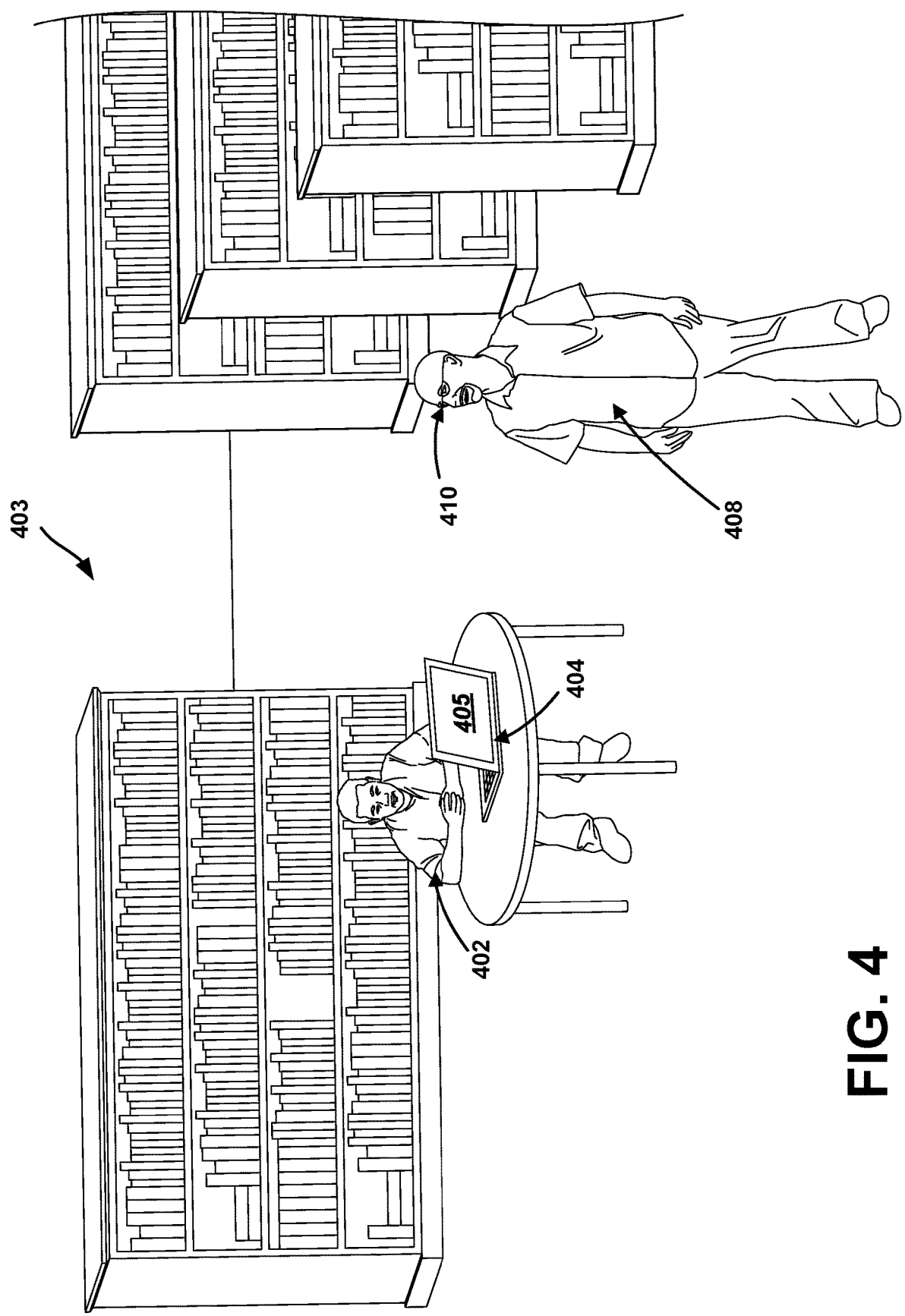
FIG. 4 is an illustration of a scenario in which an advertisement may be selected to augment a real-world aspect of the wearer-view, according to an exemplary embodiment.

To further illustrate the analysis of the wearer-view for an aspect that is appropriate for visual advertisement augmentation, consider FIG. 4, which illustrates a scenario in which an advertisement may be selected to augment a real-world aspect of the wearer-view, according to an exemplary embodiment. More specifically, FIG. 4 illustrates a scenario in which method 100 may be used to select an advertisement or advertisements for display in a manner that augments the back of the screen of a laptop computer, which is identified in the wearer-view. (For purposes of this example, the back of the laptop-computer screen may simply be referred to as a "laptop space.")

In particular, FIG. 4 shows a user 402 of a laptop computer 404, who is in a library 403 while working on the laptop computer 404. In a further aspect, FIG. 4 illustrates a wearer 408 of a wearable computing device 410, who is located near to user 402. Thus, as shown, wearer 422 may view laptop computer 404 while user 402 is sitting in library 403.

Further, HMD 410 may be configured to send gaze data, such as point-of-view video, to the ad-selection server. As such, when wearer 408 views the laptop space 405, point-of-view video from HMD 410 may capture the laptop space 405. Accordingly, when an ad-selection server receives and analyzes the gaze data from wearable computing device 410, the ad-selection server may detect laptop space 405 in the wearer-view associated with HMD 410. As such, ad-selection server may select one or more advertisements to augment the laptop space 405 in the wearer-view provided by HMD 410.

When ad-selection server detects laptop space 405 in the gaze data, the ad-selection server may interpret this as an indication that wearer 408 is viewing laptop space 405. Accordingly, the ad-selection server may then attempt to determine if there is information related to wearer 408 that can be used to select an ad that is likely to interest wearer 408. In particular, the ad-selection server may access a user-profile for wearer 408 and use information included in and/or accessible via the user-profile to select an advertisement. The ad-selection server may also determine the advertiser-value for various candidate advertisements. The ad-selection server may then utilize the combination of the interest values and the advertiser-values for various candidate advertisements when selecting an advertisement for display at the HMD.

As a specific example, if the user-profile for wearer 408 indicates that wearer 408 is a 35-year-old female who has historically purchased a new car every five years, and who last purchased a car four years and ten months ago, then the ad-selection may use this information to select an advertisement for display by HMD 410. In particular, since this information indicates that wearer 408 may be interested in buying a new car soon, the server system may determine interest values and advertiser-values for various new car advertisements.

Then, based on the interest values and the advertiser-values for the new-car advertisements, the system may select a particular new-car advertisement and send it to HMD 410. For instance, based on the user-profile for wearer 408, the system may identify a first and second new-car advertisements in which the wearer 408 is most interested. Further, if the first new-car advertisement has already been displayed to the wearer, while the second new-car advertisement has not, the advertiser-value for the second new-car advertisement may be greater than the advertiser-value for the first. Accordingly, the server system may select the second new-car advertisement and send it to the HMD 410.

In some embodiments, the server system may select more than one advertisement. In such an embodiment, the server system may indicate to HMD 410 to rotate the selected advertisements. For instance, continuing the above example, the server system may send a number of new-car advertisements HMD 410 (e.g., those having the highest overall display value), along with instructions to display a rotation of the new-car advertisements such that each advertisement augments laptop space 405, in the wearer-view. Further, the ad-selection server may rank the new-car advertisements based on their respective overall display values, so that the rotation of the advertisements in laptop space 405 can be ordered based on the ranking.

Note that while the rotation of advertisements in the above example includes advertisements that are of the same type (e.g., advertisements for cars), there is no requirement that the advertisements in a rotation be of the same type. A rotation of advertisements that is selected may include various different types of advertisements, which need not be similar to one another in any particular regard, other than having been selected using an ad-selection process such as described in reference to method 100.

iii. Incorporating a User-Profile in the Ad-Selection Process

At block 104 of method 100, the ad-selection process may take the associated user-profile into account in various ways. In particular, information from the user-profile may be used to help select an advertisement that is likely to be of interest to the user associated with the user-profile.

For example, the selection of an advertisement may be based on data included in or accessible from the user-profile such as: (a) income data, (b) consumer data providing information such as purchase history, spending habits, locations of purchases, amounts of purchases, types or categories of purchases, timing of purchases, etc., (c) purchase-history data, (d) demographic data such as age or age group, ethnicity, nationality, sex, location of residence, and/or location of workplace, (e) user-preferences indicated by the user-profile, (f) data from the user's social network account contact and/or social networking information, such as a wearer's contacts (e.g., a wearer's "friends" on the social network), and possibly data indicating a purchasing influence of the wearer with regard to their contacts (e.g., data indicating any correlation of the wearer's purchasing history to the wearers' friends' purchasing histories), (g) data from the user's e-mail account, (h) web-browsing history associated with the user-profile, (i) a computer-based calendar associated with the user-profile, (j) information from an electronic account with a financial institution (e.g., data from credit card accounts, bank accounts, investment accounts, etc.), and/or (k) other information such as income, job or job type, other job details, hobbies, interests, and so on. Other data from a user-profile or otherwise associated with a given user may also be used to select an ad for display to the user on their HMD.

In a further aspect, a user-profile may include or provide access to historical wearer-view data for the user. The historical wearer-view data may include statistics and other data related to advertisements that have been viewed by the user in the past. To facilitate such functionality, an exemplary system may be configured to generate wearer-view data for a given user-profile when advertisements are sent for display at the associated HMD (and possibly when sent for display at other devices associated with the user-profile). By doing so over time, an exemplary system may build up historical wearer-view data that can be considered when selecting an advertisement for display.

Further, the ad-selection process may take context into account when evaluating information from a user-profile. For instance, consider a user-profile that indicates the particular user is a scientist who is interested in the latest research in their field. The user-profile may also indicate that the scientist enjoys building model airplanes in their spare time, and typically purchases supplies for the model airplanes at a local hobby store. Therefore, it may be determined that the scientist will likely be interested in an advertisement for an upcoming conference in their field, as well as an advertisement for a sale on model airplanes at the local hobby store. This context information may then be utilized when selecting an advertisement for display at the scientist's HMD.

As a specific example, consider a scenario where the scientist is driving to work at their laboratory. In this scenario, context signals such as the day of the week, time, and/or the scientist's location may be used to determine that the scientist is "driving to work at their lab" (e.g., based on context signals indicating that the scientist is located on a highway along the route to the laboratory, on a weekday, at 8:00 am). Since the scientist is driving to work, a server system may determine that the scientist will likely be more interested in the advertisement for upcoming conference in their field, and take this into account when selecting an advertisement for display at the scientist's HMD.

At a later time, if the server system detects the scientist is driving home from work (e.g., based on context signals indicating that the scientist is located on a highway along the route from the laboratory, on a weekday, at 5:00 pm), it may be inferred that the scientist would rather see non-work-related advertisements. Accordingly, the server system may determine that, in this context, the scientist will likely be more interested in the advertisement for the local hobby store, and take this into account when selecting an advertisement for display at the scientist's HMD.

Context may be taken into account in numerous ways when determining an expected interest of the wearer in a particular advertisement. Use of context and context signals is described in more detail below.

Further, it should be understood that an exemplary ad-selection process may utilize almost any type of information relating to a given user, so long as the user has given permission for such information to be used for purposes of selecting and providing advertisements for them.

iv. Incorporating Value to the Advertiser in the Ad-Selection Process

At block 104 of method 100, the ad-selection process may take advertiser-value into account in various ways. For example, when determining whether to select the advertisement for display at the HMD, the advertiser-value may be combined with or weighed against the interest value for an advertisement.

The value to an advertiser of displaying an advertisement may be measured in a number of different ways, and may take into account various factors that are indicative of the value to the advertiser from the particular user viewing a given ad. For instance, the advertiser-value may be based on an expected return to the advertiser from the particular user viewing the advertisement and/or the context in which the advertisement is being viewed (e.g., the amount a user would spend if they act on the advertisement multiplied by the probability the particular user will act).

Note that in some instances, the particular wearer's interest in viewing an advertisement and the value to the advertiser of the wearer viewing the advertisement may be positively correlated. In particular, displaying an advertisement to an interested wearer may be more valuable to the advertiser than displaying an advertisement to an uninterested wearer. Therefore, in some embodiments, advertiser-value may be based on factors that are indicative of the likelihood that a given user will be interested in a particular advertisement. However, since there may be a positive correlation between the interest value and the advertiser-value for the advertisement, this correlation may be taken into account when using the interest value and the advertiser-value for a given advertisement to determine the overall display value for the advertisement.

Note that in other instances, the wearer's interest and the advertiser-value counteract each other, and thus are negatively correlated. For example, consider a user who is extremely interested in an advertisement for an expensive sports car and only somewhat interested in an advertisement for an economy car, but has historically has always purchased economy cars. In such case, the advertisement for the economy car may be selected over the ad for the sports car, since it does interest the user to some extent, and provides a much greater value to the advertiser. Other examples are also possible.

In instances where the interest value and the advertiser-value are positively or negatively correlated, the ad-selection process may take such positive and/or negative correlation into account. Further, it is possible that in some instances, there may be no correlation between the interest value and advertiser-value.

In some embodiments, historical data regarding the past display of a particular advertisement and/or similar advertisements may be considered when determining the advertiser-value. For example, in some cases, diminishing returns may be expected as an advertisement or similar advertisements (e.g., different advertisements for the same product) are repeatedly shown to the same user. Accordingly, the server system may reduce the advertiser-value for an advertisement when the advertisement or similar advertisements have been previously displayed by devices associated with the same user-profile. In such an embodiment, the server system may use historical display data to adjust the advertiser-value in a binary manner (e.g., based on whether or not the advertisement has already been displayed to the wearer), or to adjust the advertiser-value in a more granular manner (e.g., based on the specific number of times the advertisement has been displayed to the wearer).

In other cases, the past display of related advertisements may not reduce the advertiser-value, and in some cases, may increase the advertiser-value. For example, when evaluating the value to an advertiser of displaying an advertisement for a certain product, the server system may increase the advertiser-value for the advertisement when another advertiser's advertisement for a competing product has already been displayed to the wearer, and/or when the advertisement for the competing product has been displayed a greater number of times to the wearer than the advertisement being evaluated for selection. Other examples are also possible.

In some embodiments, the advertiser-value may be adjusted based on the context associated with the HMD. For example, consider a scenario where an advertisement is being selected for a user who spends more money going to movies than a typical user, who is located within walking distance of a movie theater, and who has nothing scheduled in their mobile phone's calendar for the next three hours. In this scenario, display of an advertisement for a movie playing at a nearby movie may be considered to be valuable to the advertiser, since there may be a higher probability that showing this advertisement to this user will result in the user going to see the movie, than there is for other users. Accordingly, the advertisement for the movie at the nearby movie theater may be selected and displayed at the HMD.

Context may be taken into account in numerous other ways, and in numerous other scenarios, when determining the advertiser-value. Use of context and context signals is described in more detail below.

In a further aspect, increasing the recognition of a brand may be of interest and value to an advertiser. Therefore, in some embodiments, the server system may additionally or alternatively consider brand value and/or value derived from building a brand, when determining the advertiser-value. Note that the brand-building that results from displaying an advertisement at an HMD may provide a positive the contribution to advertiser-value, regardless of whether it triggers a purchase or provides value in some other measureable way.

In some cases, the contribution of brand-building to the advertiser-value of displaying an advertisement at a particular HMD, may vary depending upon characteristics of the wearer to which the advertisement is being displayed (e.g., based on the user-profile that is associated with the HMD). For example, the same incremental increase in brand recognition with a billionaire may be considered more valuable to the advertiser than the same increase in brand recognition with a high-school freshman, who does not have the same spending power as the billionaire.

As another example, a wearer who has a thousand "friends" on the social-network account that is associated with their user-profile, may be considered more to the have more influence with others than a wearer who has only ten friends on their associated social-network account. Therefore, the same incremental increase in brand recognition with the wearer who has a thousand "friends" on their social-network account, may be considered more valuable to the advertiser than the same increase in brand recognition with the wearer who has only ten friends on their social-network account.

It should be understood that other factors may be considered when determining the advertiser-value, in addition or in the alternative to the factors described above. Furthermore, as the above-described techniques are provided for illustrative purposes, it should be understood that other techniques for determining the value to the advertiser of displaying a given advertisement at a given HMD are possible.

In a further aspect, the selection of an advertisement that is more likely to interest a given user and/or that increases the value provided to the advertiser, does not necessarily correspond to an increase in the amount that the advertiser is ultimately charged. While this may be the case in some embodiments, other embodiments may involve charging a lesser amount to an advertiser because their advertisement is more likely to interest a certain user and/or because the advertisement is more valuable to the advertiser.

While this may seem counter-intuitive in one sense, this strategy of charging less for more valuable advertisement selection may provide long-term gains. In particular, by displaying advertisements that are likely to interest users, the advertising as a whole may gain credibility with the viewing public, which may result in more people viewing advertisements in the long-term. Put another way, if people are disinterested in an advertisement that is displayed to them, they may choose not to view and/or ignore advertisements that are displayed in the future and/or request that advertisements not be displayed to them in their HMD. Therefore, by reducing the amount charged for advertising that interests users, advertisers are incentivized to provide advertising that is interesting. Providing such incentivizes may in turn increase the chances for long-term success in the advertising space and similar types of advertising spaces, thus creating more long term value for the seller and/or a third-party that is brokering advertisement sales.

III. SERVER SYSTEMS

In general, an exemplary system may be implemented in or may take the form of a server system or a component thereof. For instance, an exemplary system may take the form of non-transitory computer readable medium, which has program instructions stored thereon that are executable by at a processor to provide the functionality described herein. An exemplary system may also take the form of a computing device itself, a subsystem of such a device, or a combination of multiple computing devices, which include a non-transitory computer readable medium having such program instructions stored thereon.

Figure 5:
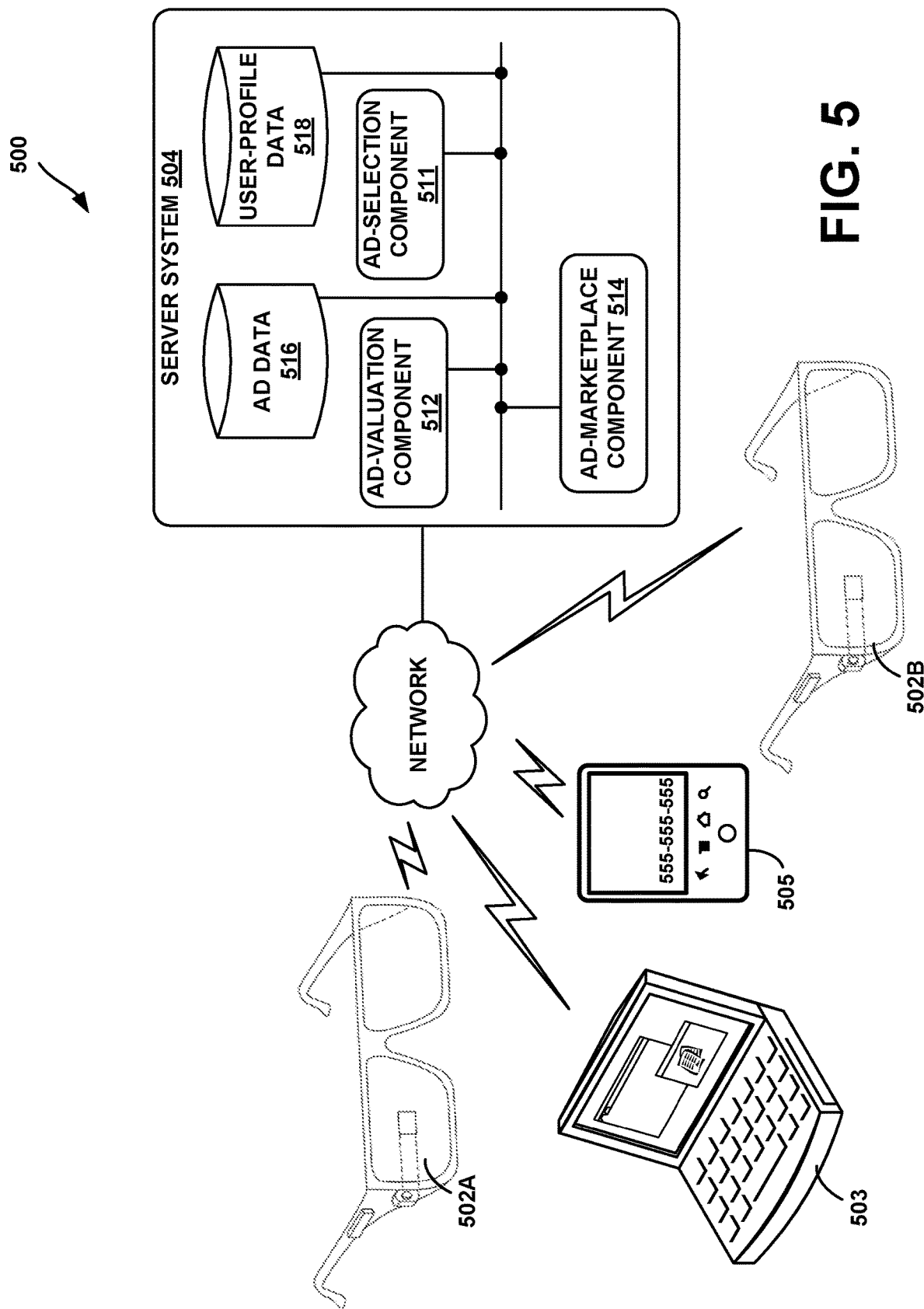
FIG. 5 is a simplified block diagram illustrating a communication network via which gaze data may be received, according to an exemplary embodiment.

FIG. 5 is a simplified block diagram illustrating a communication network via which gaze data may be received, according to an exemplary embodiment. As shown, communication network 500 includes a number of wearable computing devices 502A and 502B, which are configured to communicate with a server system 504 via one or more networks 506. As such, server system 504 may be configured to receive gaze data from wearable computing devices 502A and 502B, which may be HMDs or may take another form. The server system 504 may then utilize the gaze data to carry out functions of a method, such as method 100 of FIG. 1, to select an ad for display at a wearable computing device 502A or 502B.

In order to facilitate an exemplary method, the users of wearable computing devices 502A and 502B may register their respective devices and opt in to programs via which the users of these devices submit gaze data from their respective devices. Further, a user may agree to use of their gaze data for various purposes, such as for valuing advertisements, for valuing the user's own gaze, for determining the value to the advertiser of the user viewing an advertisement in the display of their HMD, and/or for providing advertising and/or other information that is customized for the user. As such, wearable computing devices 502A and 502B may send gaze data to the server system 504 so that the server system 504 can select and/or determine when advertisements should be displayed at the wearable computing devices 502A and 502B.

As noted, the gaze data in an exemplary embodiment may include point-of-view videos captured by a number of wearable computing devices. For example, some or all of the wearable computing devices 502A and 502B may include or take the form of glasses-style HMDs that each include a forward-facing video camera for taking point-of-view video (e.g., video that generally captures the perspective of a person wearing the HMD). As such, when the HMD is worn, the forward-facing camera will capture video and/or images that are generally indicative of what the wearer of the HMD sees. Note that exemplary glasses-style HMDs will be described in greater detail with reference to FIGS. 6A, 6B, 6C, 6D, and 7.

In a further aspect, communication network 500 may also include computing devices other than wearable computing devices, such as laptop computer 503 and mobile phone 505, for instance. Other types of computing devices are also possible. In such an embodiment, laptop 503, mobile phone 505, and/or other computing devices may provide supplemental gaze data, which may be used by server system 504 to supplement the gaze data from wearable computing devices 502A and 502B.

The server system 504 may be a computing system including one or more computing devices. In particular, server system 504 may be a cloud-based server system that is configured for server-system functions described herein. In the illustrated example, server system 504 may include or be in communication with an ad-selection component 511, an ad-valuation component 512 and an ad-marketplace component 514, which are configured for various advertisement-related functions (and possibly other functions as well), including functions based on gaze data from wearable computing devices 502A and 502B.

In some embodiments, ad-selection component 511, ad-valuation component 512 and ad-marketplace component 514 may take the form of or include software, hardware, and/or firmware for providing the functionality described herein. In particular, these components may include program instructions stored in a tangible computer-readable medium that are executable to provide the functionality described herein, and possibly to provide other functionality as well.

Further, each of components 511, 512, and 514 may be a subsystem of a computing device, a computing device unto itself, or may be a system that includes one or more computing devices. For instance, each of components 511, 512, and 514 may be a separate server system, which includes one or more computing devices. Alternatively, some or all of the functionality attributed to ad-selection component 511, ad-valuation component 512, and/or ad-marketplace component 514 may be provided by a combined server system, which may include one or more computing devices. Further, other types and combinations of hardware, software, and/or firmware may provide some or all of the functionality of ad-selection component 511, ad-valuation component 512, and/or ad-marketplace component 514, without departing from the scope of the invention. Other variations on the illustrated arrangement of components are also possible.

In a further aspect, server system 504 may include or have access to various databases including data that may be utilized to provide the functionality described herein. In the illustrated example, server system 504 includes an advertisement database 516 and a user-profile database 518. Other databases are also possible.

Further, note that while advertisement database 516 and user-profile database 518 are shown as separate databases, some or all of the data described as being stored advertisement database 516 and/or user-profile database 518 may be combined in a common database or in various other arrangements of databases. Additionally or alternatively, advertisement database 516 and/or user-profile database 518 may each be implemented by multiple databases. Yet further, while advertisement database 516 and user-profile database 518 are illustrated as components of server system 504, some or all of these databases may be included in a separate computing system or systems that are accessible to server system 504. Other variations on the illustrated arrangement of databases are also possible.

Advertisement database 516 may include data identifying and/or describing advertisements that are available for display at an HMD. In an exemplary embodiment, advertisement database 516 may include data indicating characteristics of users and/or types of users for which specific advertisements are intended. Accordingly, ad-selection component 511 may be configured to utilize the advertisement data stored in advertisement database 516 to help select an advertisement that is more likely to appeal to the wearer of a given wearable computing device.

Yet further, in order to determine which advertisement or advertisements are likely to appeal to the wearer of a given wearable computing device, user-profile database 518 may include user-profile data for a number of users, may provide access to other sources of data related to users, and/or may indicate other storage locations for data relating users. The user-profile data stored in or accessible via user-profile database 518 may therefore be helpful in determining what type of advertisement may appeal to a given user.

In some instances, an identifier for the associated user-profile may be included in the gaze data. In this case, ad-selection component 511 may use the identifier to locate user-profile data for the associated user-profile in user-profile database 518.

However, in other instances, gaze data may not indicate the associated user-profile. As such, user-profile database 518 may also include data that allows ad-selection component 511 to determine a user-profile that corresponds to the HMD from which the gaze data is received. For example, a user may pre-associate the user's wearable computing device (e.g., the user's HMD) with their user-profile, such as by registering their device with server system 504. As such, when ad-selection component 511 receives gaze data, it may determine which wearable computing device 502A provided the gaze data (e.g., by using an identifier of the wearable computing device included in the gaze data), and then determine the user-profile that is currently associated with the wearable computing device 502A.

In either case, ad-selection component 511 may monitor the wearer-view indicated by the gaze data from a wearable computing device 502A for aspects of the wearer-view that are appropriate for augmentation with advertisement. When such an aspect is detected, ad-selection component 511 may access user-profile data stored in user-profile database 518, and in particular, may access the user-profile that is associated with the wearable computing device 502A from which the gaze data was received. Information from the associated user-profile may then be used to select an advertisement for display at the wearable computing device 502A. For example, ad-selection component 511 may compare and/or match advertisement preferences and/or characteristics from the associated user-profile to characteristics of candidate advertisements, as indicated by advertisement data in advertisement database 516. Based on this comparison, the ad-selection component 511 may select one or more advertisements having characteristics that match up well with the preferences and/or characteristics indicated by the associated user-profile.

In a further aspect, an exemplary server system 504 may be configured to provide advertisements described or stored in ad database 516 for display at wearable computing devices 502A and 502B.

In FIG. 5, communications between the various devices 502A, 502B, 503, 505, the server system 504 are illustrated as being conducted via wireless connections; however, wired connections may additionally or alternatively be used. For example, an exemplary embodiment may conduct wired communications via a wired serial bus such as a universal serial bus or a parallel bus, or via another type of wired connection. A wired connection may be a proprietary connection as well. Further, wireless communications may utilize various different types of wireless connections and protocols such as Bluetooth® radio technology, communication protocols described in IEEE 802.11 (including any IEEE 802.11 revisions), Cellular technology (such as GSM, CDMA, UMTS, EV-DO, WiMAX, or LTE), and/or Zigbee technology, among other possibilities.

It should be understood that the arrangements shown in FIG. 5 and described herein are provided for illustrative purposes, and are not intended to be limiting. Those skilled in the art will understand that variation on the illustrated arrangement and other arrangements are possible, without departing from the scope of the invention.

IV. INCORPORATING CONTEXT IN VARIOUS EMBODIMENTS

In a further aspect, an exemplary method may take context information into account. For example, as noted above, a server system may take the context associated with the HMD into account when determining whether an aspect of the wearer-view is appropriate for visual advertisement augmentation. As further noted above, context may be taken into account when selecting an advertisement for display at the HMD. In particular, context may be considered when determining the expected interest of a particular wearer (e.g., when determining an interest value) and/or when determining the value to the advertiser of displaying a particular advertisement at an HMD. Context information may be incorporated in other ways as well.

To determine a context associated with a given HMD (which may be inferred to be the context for the associated user-profile), a cloud-based server may be configured to use context data from a single device that is associated with the user-profile. For instance, referring back to FIG. 5, server 504 may use context data from a single device, such as wearable computing device 502A or 502B, to determine context for the user-profile that is associated with that device. Alternatively, the server may be configured to aggregate context data from two or more devices that are associated with the user-profile, and us the aggregate context data to determine context for the user-profile. For example, if a number of devices are all associated with the same user-profile, such as wearable computing device 502A, mobile phone 505, and laptop computer 503, for example, then context data from some or all of the associated devices may be aggregated when determining context for the associated user-profile.

In an exemplary embodiment, the context associated with a given device may be determined using various techniques.

In general, a "context" may be determined based on various "context signals" or combinations of context signals. A context signal may be any signal that provides a measurement or otherwise provides information pertaining to the state or the environment associated with a certain subject (e.g., with a certain user, device, event, etc.). In this case, the context signals associated are generally pertain to a user-profile for a wearer of a wearable computing device. As such, the context signals may generally provide some type of information pertaining to the state or the environment of the wearer.

In some instances, a context may be a state associated with a particular context signals or set of context signals. However, a context may also be abstracted from the context signals upon which it is based. As such, a "context" may also be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For example, context signals indicating that that it is 6:30 AM on a weekday and that a user is located at their home may be used to determine the context that the user is "getting ready for work."

Many types of information, from many different sources, may be used as context signals or provide information from which context signals may be derived. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information, (bb) a current location, (cc) a past location, and (dd) a future location, among others. Those skilled in the art will understand that the above list of possible context signals and sources of context information is not intended to be limiting, and that other context signals and/or sources of context information are possible in addition, or in the alternative, to those listed above.

In some embodiments, the detection or observation of a certain event in data from a certain data source may itself be interpreted as a context signal. For example, the fact that a certain word is detected in an audio signal from a microphone may be interpreted as a context signal providing context to the event of that word being spoken. Other examples are also possible.

In some embodiments, context signals may be obtained or derived from sources such as a user's computer-based calendar, blog, webpage, social network account, and/or e-mail account, among others. For instance, context signals may be provided by user's calendar entries, e-mail messages, and social-network profile, messages, posts, and/or tweets. Further, in some embodiments, similar context signals may be obtained or derived from other users' computer-based calendars, blogs, webpages, social network accounts, and/or e-mail accounts, who are listed in a user's electronic contact list, listed as a "friend" in a user's social network, or otherwise associated with the user (provided such users have opted in to share such context information).

It should be understood that the above examples of contexts, context signals, techniques for determining a context, and/or techniques for using context when selecting an advertisement are provided for illustrative purposes, and are not intended to be limiting. Other examples and/or techniques are also possible.

V. ALLOWING FOR MULTIPLE USERS OF A WEARABLE COMPUTING DEVICE

In many cases, a wearable computing device may remain associated with the same user (and thus the same user-profile and/or user-account) for an extended period of time, or even permanently. However, it is also possible that two or more users may share a wearable computing device. In such case, the user-profile and/or the user-account that is associated user-profile may be updated, depending on which user is using the wearable computing device at a given point in time. Accordingly, when an aspect that is appropriate augmentations with advertising is detected in gaze data from a wearable computing device, the type of advertisement that is selected for display may vary depending upon which user-profile is currently associated with the wearable computing device.

Accordingly, an exemplary method such as method 100 of FIG. 1 may further involve a determination of which user-profile is associated with the gaze data, before the user-profile is used to select an advertisement for display. In particular, there may be two or more user-profiles that are associable with a given wearable computing device. As such, to determine the user-profile associated with the gaze data, an exemplary system may determine which one of the associable user-profiles is currently associated with the wearable computing device. To do so, the system may query a current-user database with an identifier (e.g., a unique identification code) for the wearable computing device in order to determine which user-profile is currently associated with the wearable computing device.

To facilitate the above feature, an exemplary system may support a login interface (e.g., a web- or application-based interface), via which a user can indicate that they are currently using the device, such that the user's user-profile can be associated with the device. Additionally or alternatively, web- or application-based interface may be provided that allows a current user of a wearable computing device (e.g., the owner) to temporarily give another user access to the wearable computing device. This interface may allow the user to indicate the user-profile to which access is being granted and/or the time period during which access is being granted such that the indicated user-profile may be granted access during the time period.

Further, in some instances, the associated user-profile may be updated by the system based on an inference that a different user is using the wearable computing device. For example, a wearable computing device may be associated with other devices, such as a mobile phone. Further, a user may associate their wearable computing device and their other devices with the same user-profile. In this scenario, the system may initially detect that the wearable computing device is associated with a mobile phone from a first user-profile, with which the wearable computing device is also associated. However, at a later point in time, an exemplary system may determine that the wearable computing device is associated with a different mobile phone, which is associated with a second user-profile. In response, the system may update a current-user database to associate the wearable computing device the second user-profile.

Yet further, in some embodiments, a change in the associated user-profile may be inferred from a change in user-response to advertisements that are displayed. For example, if it assumed that the longer the viewing duration and/or the more intently a person looks at the ad (e.g., as indicated by a focus value), the better the advertisement selection is, then a decrease in the viewing duration and/or a decrease in focus may be interpreted to mean that a different user is wearing the wearable computing device.

For instance, consider a first user who has typically viewed lipstick advertisements for a duration that is indicative of successful advertisement selection. If a first user loans out their wearable computing device to a second user who is not interested in lipstick advertisements, then this may be reflected by a decrease in the viewing duration and/or a decrease in focus when lipstick advertisements are displayed such that the selection of each of these advertisements for display is deemed "unsuccessful." Accordingly, after displaying a certain number of unsuccessful lipstick advertisements, an exemplary system may update the selection process and start showing other kinds of advertisements in an attempt to learn what the second-user responds positively to (e.g., to create a user-profile or identify an existing user-profile for the second user).

VI. WEARABLE-COMPUTER-BASED FUNCTIONALITY

The above-described methods and systems are generally described with reference to examples where a wearable computing device sends gaze data to a server system or systems, and where the server system or systems generally provide most of the functionality for selecting advertisements for display at an HMD. This may be referred to as a "cloud-based" implementation. However, it should be understood that wearable-computer-based implementations and partially cloud-based implementations are also possible. Thus, it should be understood that some or all of the functionality that is described herein as being carried out by a server system may alternatively be carried out at a wearable computing device.

As such, a wearable computing device, such as an HMD, may carry out functions that are analogous or similar to those of method 100, which are described above as being carried out by a server system. For example, an HMD may receive gaze data that is indicative of its associated wearer-view (e.g., by acquiring POV image data from its own camera). The HMD may then selecting at least one advertisement for display on its display; basing the selection on (a) the wearer-view, (b) a user-profile that is currently associated with the HMD, and (c) an advertiser-value that is associated with display of the advertisement at the HMD. The HMD may then display the selected advertisement in its display. Other examples are also possible.

VII. EXEMPLARY WEARABLE COMPUTING DEVICES

Figure 6A:
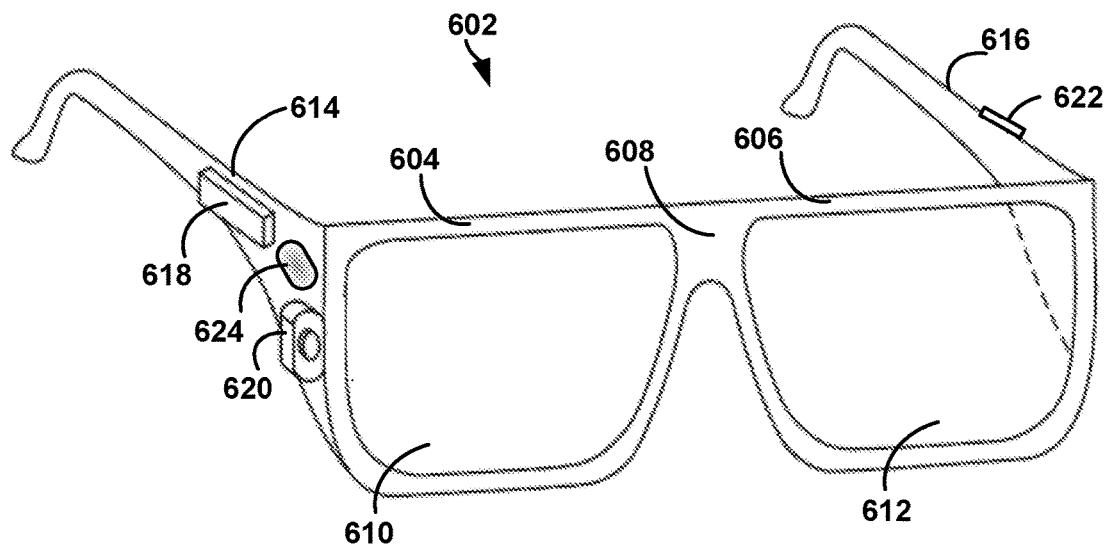
FIG. 6A illustrates a wearable computing system, according to an exemplary embodiment.

FIG. 6A illustrates a wearable computing system according to an exemplary embodiment. In FIG. 6A, the wearable computing system takes the form of a head-mountable device (HMD) 602 (which may also be referred to as a head-mountable display). It should be understood, however, that exemplary systems and devices may take the form of or be implemented within or in association with other types of devices, without departing from the scope of the invention. As illustrated in FIG. 6A, the head-mountable device 602 comprises frame elements including lens-frames 604, 606 and a center frame support 608, lens elements 610, 612, and extending side-arms 614, 616. The center frame support 608 and the extending side-arms 614, 616 are configured to secure the head-mountable device 602 to a user's face via a user's nose and ears, respectively.

Each of the frame elements 604, 606, and 608 and the extending side-arms 614, 616 may be formed of a solid structure of plastic and/or metal, or may be formed of a hollow structure of similar material so as to allow wiring and component interconnects to be internally routed through the head-mountable device 602. Other materials may be possible as well.

One or more of each of the lens elements 610, 612 may be formed of any material that can suitably display a projected image or graphic. Each of the lens elements 610, 612 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 614, 616 may each be projections that extend away from the lens-frames 604, 606, respectively, and may be positioned behind a user's ears to secure the head-mountable device 602 to the user. The extending side-arms 614, 616 may further secure the head-mountable device 602 to the user by extending around a rear portion of the user's head. Additionally or alternatively, for example, the HMD 602 may connect to or be affixed within a head-mountable helmet structure. Other possibilities exist as well.

The HMD 602 may also include an on-board computing system 618, a video camera 620, a sensor 622, and a finger-operable touch pad 624. The on-board computing system 618 is shown to be positioned on the extending side-arm 614 of the head-mountable device 602; however, the on-board computing system 618 may be provided on other parts of the head-mountable device 602 or may be positioned remote from the head-mountable device 602 (e.g., the on-board computing system 618 could be wire- or wirelessly-connected to the head-mountable device 602). The on-board computing system 618 may include a processor and memory, for example. The on-board computing system 618 may be configured to receive and analyze data from the video camera 620 and the finger-operable touch pad 624 (and possibly from other sensory devices, user interfaces, or both) and generate images for output by the lens elements 610 and 612.

The video camera 620 is shown positioned on the extending side-arm 614 of the head-mountable device 602; however, the video camera 620 may be provided on other parts of the head-mountable device 602. The video camera 620 may be configured to capture images at various resolutions or at different frame rates. Many video cameras with a small form-factor, such as those used in cell phones or webcams, for example, may be incorporated into an example of the HMD 602.

Further, although FIG. 6A illustrates one video camera 620, more video cameras may be used, and each may be configured to capture the same view, or to capture different views. For example, the video camera 620 may be forward facing to capture at least a portion of the real-world view perceived by the user. This forward facing image captured by the video camera 620 may then be used to generate an augmented reality where computer generated images appear to interact with the real-world view perceived by the user.

The sensor 622 is shown on the extending side-arm 616 of the head-mountable device 602; however, the sensor 622 may be positioned on other parts of the head-mountable device 602. The sensor 622 may include one or more of a gyroscope or an accelerometer, for example. Other sensing devices may be included within, or in addition to, the sensor 622 or other sensing functions may be performed by the sensor 622.

The finger-operable touch pad 624 is shown on the extending side-arm 614 of the head-mountable device 602. However, the finger-operable touch pad 624 may be positioned on other parts of the head-mountable device 602. Also, more than one finger-operable touch pad may be present on the head-mountable device 602. The finger-operable touch pad 624 may be used by a user to input commands. The finger-operable touch pad 624 may sense at least one of a position and a movement of a finger via capacitive sensing, resistance sensing, or a surface acoustic wave process, among other possibilities. The finger-operable touch pad 624 may be capable of sensing finger movement in a direction parallel or planar to the pad surface, in a direction normal to the pad surface, or both, and may also be capable of sensing a level of pressure applied to the pad surface. The finger-operable touch pad 624 may be formed of one or more translucent or transparent insulating layers and one or more translucent or transparent conducting layers. Edges of the finger-operable touch pad 624 may be formed to have a raised, indented, or roughened surface, so as to provide tactile feedback to a user when the user's finger reaches the edge, or other area, of the finger-operable touch pad 624. If more than one finger-operable touch pad is present, each finger-operable touch pad may be operated independently, and may provide a different function.

Figure 6B:
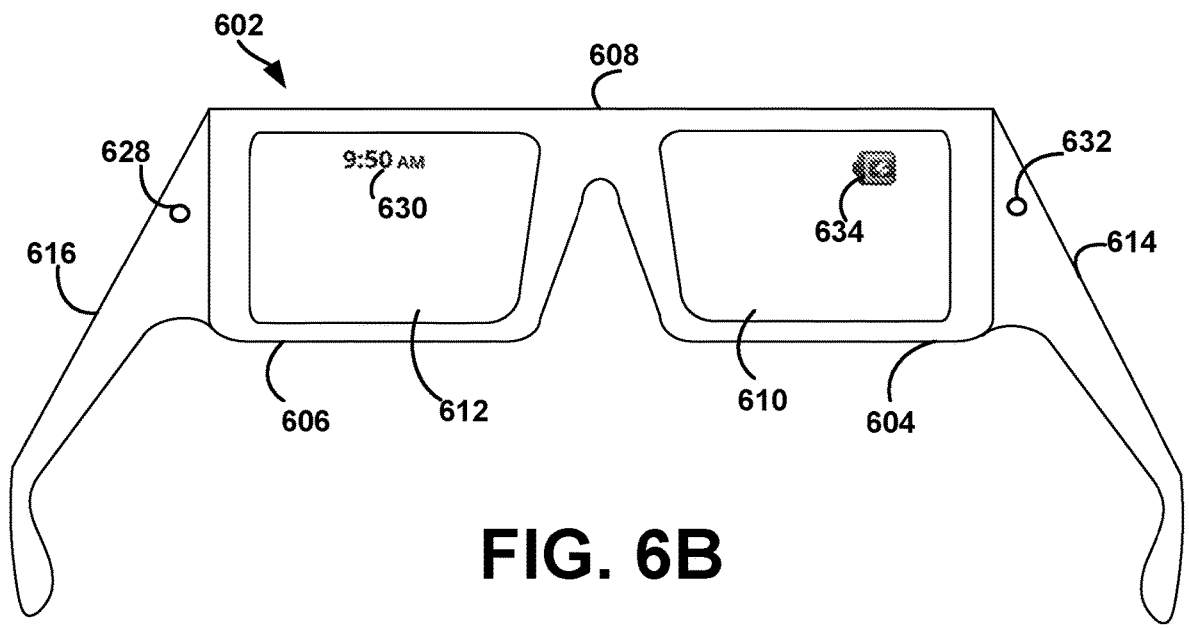
FIG. 6B illustrates an alternate view of the wearable computing device illustrated in FIG. 6A.

FIG. 6B illustrates an alternate view of the wearable computing device illustrated in FIG. 6A. As shown in FIG. 6B, the lens elements 610, 612 may act as display elements. The head-mountable device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610, 612 may act as a combiner in a light projection system and may include a coating that reflects the light projected onto them from the projectors 628, 632. In some embodiments, a reflective coating may not be used (e.g., when the projectors 628, 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 604, 606 for driving such a matrix display. Alternatively or additionally, a laser or LED source and scanning system could be used to draw a raster display directly onto the retina of one or more of the user's eyes. Other possibilities exist as well.

Figure 6C:
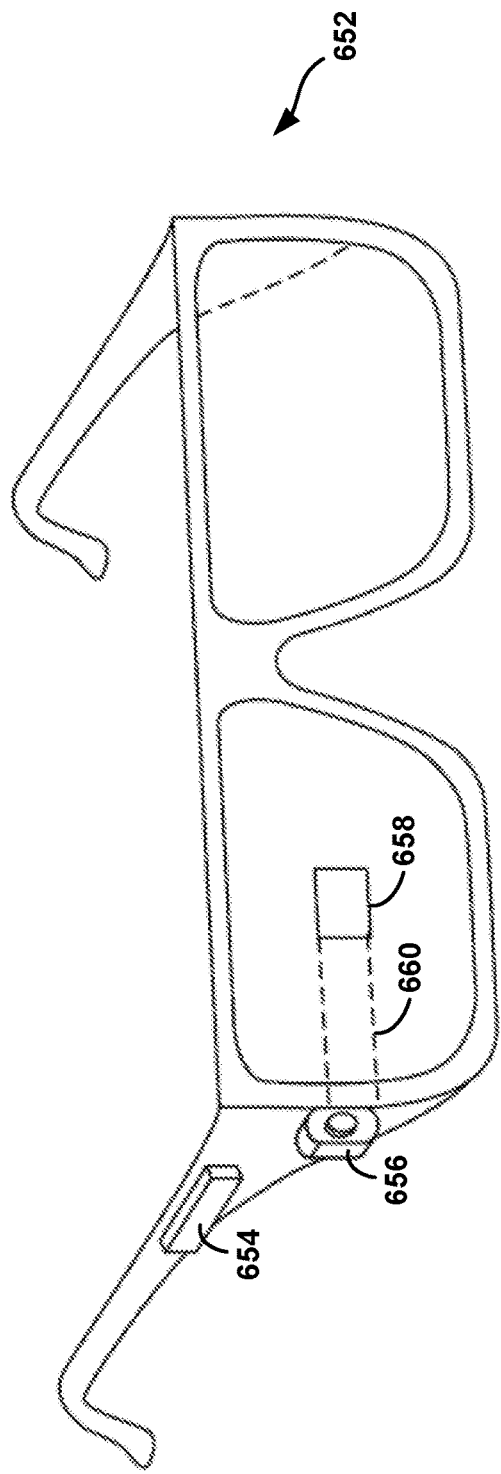
FIG. 6C illustrates another wearable computing system according to an exemplary embodiment.

FIG. 6C illustrates another wearable computing system according to an exemplary embodiment, which takes the form of an HMD 652. The HMD 652 may include frame elements and side-arms such as those described with respect to FIGS. 6A and 6B. The HMD 652 may additionally include an on-board computing system 654 and a video camera 656, such as those described with respect to FIGS. 6A and 6B. The video camera 656 is shown mounted on a frame of the HMD 652. However, the video camera 656 may be mounted at other positions as well.

As shown in FIG. 6C, the HMD 652 may include a single display element 658 which may be embedded in the lens element and coupled to the device. The display element 658 may be formed on one of the lens elements of the HMD 652, such as a lens element described with respect to FIGS. 6A and 6B, and may be configured to overlay computer-generated graphics in the user's view of the physical world. The display element 658 is shown to be provided in a center of a lens of the HMD 652; however, the display element 658 may be provided in other positions.

The display element 658 may be implemented in various ways. For example, display element 658 is illustrated as being an optical see-through display, which is controllable via the computing system 654 that is coupled to the display element 658 via an optical waveguide 660. Other types of optical see-through displays are also possible. Further, an HMD may implement other types of near-eye displays, such as a video see-through display or an optical see-around display, without departing from the scope of the invention.

Figure 6D:
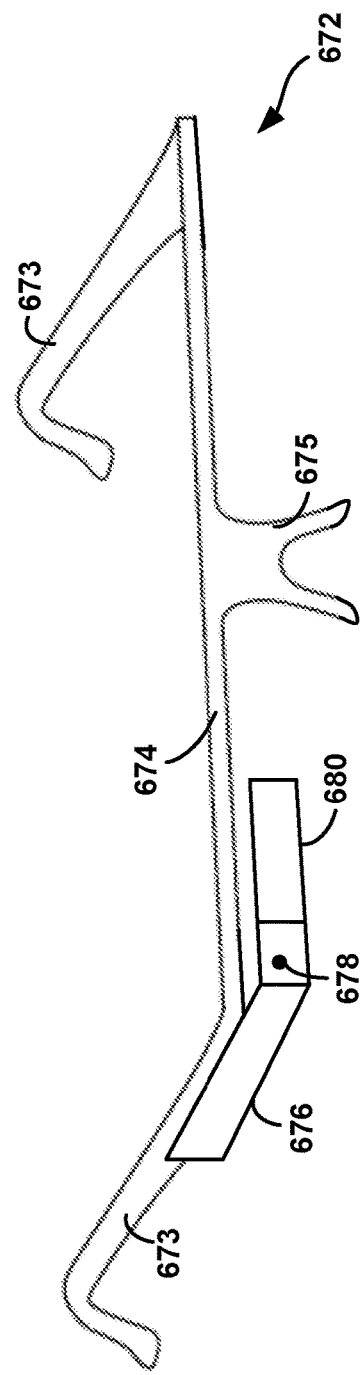
FIG. 6D illustrates another wearable computing system according to an exemplary embodiment.

FIG. 6D illustrates another wearable computing system according to an exemplary embodiment, which takes the form of an HMD 672. The HMD 672 may include side-arms 673, a center frame support 674, and a bridge portion with nosepiece 675. In the example shown in FIG. 6D, the center frame support 674 connects the side-arms 673. The HMD 672 does not include lens-frames containing lens elements. The HMD 672 may additionally include an on-board computing system 676 and a video camera 678, such as those described with respect to FIGS. 6A and 6B.

The HMD 672 may include a single display element 680 that may be coupled to one of the side-arms 673 or the center frame support 674. The display element 680 may be configured in a similar manner as described with reference to FIG. 6C, and may be configured to overlay computer-generated graphics upon the user's view of the physical world. In one example, the single display element 680 may be coupled to the inner side (i.e., the side exposed to a portion of a user's head when worn by the user) of the extending side-arm 673. The single display element 680 may be positioned in front of or proximate to a user's eye when the HMD 672 is worn by a user. For example, the single display element 680 may be positioned below the center frame support 674, as shown in FIG. 6D.

FIG. 7 illustrates a schematic drawing of a computing device according to an exemplary embodiment. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mountable devices 602, 652, or 672 described with reference to FIGS. 6A-6D.

Thus, the device 710 may include a display system 712 comprising a processor 714 and a display 716. The display 710 may be, for example, an optical see-through display, an optical see-around display, or a video see-through display. The processor 714 may receive data from the remote device 730, and configure the data for display on the display 716. The processor 714 may be any type of processor, such as a micro-processor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc.

In FIG. 7, the communication link 720 is illustrated as a wireless connection; however, wired connections may also be used. For example, the communication link 720 may be a wired serial bus such as a universal serial bus or a parallel bus. A wired connection may be a proprietary connection as well. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 730 may be accessible via the Internet and may include a computing cluster associated with a particular web service (e.g., social-networking, photo sharing, address book, etc.).

VIII. CONCLUSION

It should be understood that the terms "head-mounted display," "head-mounted device," "head-mountable display," and "head-mountable display" can be used interchangeably. In particular, these terms may refer to a wearable computing device that, when worn, provides or supports at least one near-eye display. It should be further understood that such a device may be considered to be a head-mounted display whether it is worn or not; i.e., such a device is simply mountable and is not necessarily worn at any given point in time, unless it is explicitly specified as being worn.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented method comprising:
   receiving, with one or more processors, point-of-view (POV) image data from an augmented reality (AR) display device;
   detecting, with the one or more processors, a real-world product and a location of the real-world product in the POV image data;
   determining, with the one or more processors, a value for an advertisement associated with the real-world product;
   selecting, with the one or more processors, the advertisement for display based on the value;
   determining, with the one or more processors, a location for displaying the selected advertisement on the real-world product based on the detected location of the real-world product in the POV image data; and
   outputting, with the one or more processors, to the AR display device, the selected advertisement and instructions to display the selected advertisement at the determined location.

2. The method of claim 1, further comprising:
   using one or more real-world aspects detected in the POV image data to determine a context of the AR display device; and
   using the determined context as a basis for determining the at least one related product for the detected real-world product.

3. The method of claim 1, further comprising:
   determining a user-profile associated with the AR display device; and
   using the associated user-profile as a basis for determining the at least one related product for the detected real-world product.

4. The method of claim 3, wherein the at least one related product is determined based at least in part on data from the user-profile, wherein the data comprises one or more of the following types of data: (a) consumer data, (b) purchase-history data, (c) data from an associated social network account, (d) data from an associated e-mail account, (e) user-preferences indicated by the user-profile, (f) web-browsing history associated with the user-profile, and (g) a computer-based calendar associated with the user-profile.

5. The method of claim 1, further comprising:
   using one or more real-world aspects detected in the POV image data to determine a context of the AR display device;
   determining a user-profile associated with the AR display device; and
   using both (a) the determined context, and (b) the associated user-profile, as a basis for determining the at least one related product for the detected real-world product.

6. The method of claim 1, wherein the AR display device comprises an optical see-through display.

7. The method of claim 1, further comprising:
   analyzing, by the AR display device, the POV image data for one or more aspects of a wearer environment that are appropriate for visual augmentation with the graphical comparison between the real-world product and the at least one related product.

8. The method of claim 7, further comprising:
determining one or more visual characteristics of the graphical comparison based on characteristics of a real-world environment at a location selected for display of the graphical comparison.

9. A system comprising:
at least one processor;
a non-transitory computer-readable medium; and
program instructions stored on the non-transitory computer-readable medium and executable by the at least one processor to:
receive point-of-view (POV) image data from an augmented reality (AR) display device;
detect a real-world product and a location of the real-world product in the POV image data;
determine a value for an advertisement associated with the real-world product;
select the advertisement for display based on the value;
determine a location for displaying the selected advertisement on the real-world product based on the detected location of the real-world product in the POV image data; and
output to the AR display device to display the selected advertisement and instructions to display the selected advertisement at the determined location.

10. A computing device comprising:
a graphical display device arranged for display of augmented reality (AR) media content;
an image capture device arranged to capture point-of-view (POV) image data associated with computing device;
at least one processor;
a non-transitory computer-readable medium; and
program instructions stored on the non-transitory computer-readable medium and executable by the at least one processor to:
operate the image capture device to capture POV image data;
detect a real-world product and a location of the real-world product in the captured POV image data;
determine a value for an advertisement associated with the detected real-world product;
select the advertisement for display based on the value;
determine a location for displaying the selected advertisement on the real-world product based on the detected location of the real-world product in the POV image data; and
output to the graphical display device to display the selected advertisement and instructions to display the selected advertisement at the determined location.

11. The system of claim 10, wherein the graphical display device comprises an optical see-through display.

12. The system of claim 10, wherein the computing device comprises or is included in a wearable computing device.

13. The system of claim 10, wherein the computing device comprises or is included in a mobile computing device.

14. The system of claim 10, further comprising program instructions stored on the non-transitory computer-readable medium and executable by the at least one processor to:
use one or more real-world aspects detected in the POV image data to determine a context of the computing device; and
use the determined context as a basis for determining the at least one related product for the detected real-world product.

15. The system of claim 10, further comprising:
determining a user-profile associated with the computing device; and
using the associated user-profile as a basis for determining the at least one related product for the detected real-world product.

16. The system of claim 15, wherein the at least one related product is determined based at least in part on data from the user-profile, wherein the data comprises one or more of the following types of data: (a) consumer data, (b) purchase-history data, (c) data from an associated social network account, (d) data from an associated e-mail account, (e) user-preferences indicated by the user-profile, (f) web-browsing history associated with the user-profile, and (g) a computer-based calendar associated with the user-profile.

17. The system of claim 10, further comprising program instructions stored on the non-transitory computer-readable medium and executable by the at least one processor to:
use one or more real-world aspects detected in the POV image data to determine a context of the computing device;
determine a user-profile associated with the computing device; and
use both (a) the determined context, and (b) the associated user-profile, as a basis for determining the at least one related product for the detected real-world product.

18. The method of claim 1, wherein determining the location for displaying the selected advertisement on the real-world product includes detecting a space on the location of the real-world product for an advertisement, and sending to the AR display device the advertisement includes displaying the advertisement on the detected space.

19. The method of claim 1, wherein selecting the advertisement for display based on the value includes comparing the value of the advertisement to a second value of a second potential advertisement, wherein the value of the advertisement for display is greater than the second value of the second potential advertisement.

20. The system of claim 9, wherein determining the location for displaying the selected advertisement on the real-world product includes detecting a space on the location of the real-world product for an advertisement, and sending to the AR display device the advertisement includes displaying the advertisement on the detected space.

* * * * *